United States Patent
Tanaka et al.

[11] Patent Number: 5,905,589
[45] Date of Patent: May 18, 1999

[54] LIGHT TRANSMITTANCE ADJUSTING APPARATUS

[75] Inventors: Takeshi Tanaka; Tomoyuki Kikuta, both of Toyohashi; Hidetoshi Suzuki, Hamamatsu; Takayoshi Suzuki, Toyohashi; Daisuke Kuribayashi, Kosai, all of Japan

[73] Assignee: Asmo Co., Ltd., Kosai, Japan

[21] Appl. No.: 08/963,070

[22] Filed: Nov. 3, 1997

Related U.S. Application Data

[63] Continuation of application No. 08/580,292, Dec. 28, 1995, abandoned.

[30] Foreign Application Priority Data

Dec. 29, 1994 [JP] Japan ..................... 6-339755
Aug. 30, 1995 [JP] Japan ..................... 7-22315

[51] Int. Cl.$^6$ ................... G02B 26/02
[52] U.S. Cl. ............. 359/230; 359/229; 359/232; 359/233; 359/291; 359/295; 359/889; 296/96.19; 296/97.4
[58] Field of Search ............. 359/230, 232, 359/233, 290, 291, 295, 296, 889, 229; 296/97.4, 96.19

[56] References Cited

U.S. PATENT DOCUMENTS 5,062,689  11/1991  Koehler ................... 359/230

FOREIGN PATENT DOCUMENTS

| | | |
|---|---|---|
| 38 07 598 | 9/1989 | Germany . |
| 42 08 267 | 9/1993 | Germany . |
| 42 32 660 | 10/1993 | Germany . |
| 58-25218 | 2/1983 | Japan . |
| 61-98892 | 5/1986 | Japan . |
| 5-130784 | 5/1993 | Japan . |
| 5-191982 | 7/1993 | Japan . |
| 6-8730 | 1/1994 | Japan . |
| 6-59201 | 3/1994 | Japan . |
| 6-121550 | 4/1994 | Japan . |
| 7-16599 | 3/1995 | Japan . |
| 7-42572 | 8/1995 | Japan . |
| 7-281110 | 10/1995 | Japan . |

Primary Examiner—Georgia Epps
Assistant Examiner—Margaret Burke
Attorney, Agent, or Firm—Burns, Doane, Swecker & Mathis, LLP

[57] ABSTRACT

A light transmittance adjusting apparatus for adjusting a windowpane of an automobile or a building has a fixed member and a movable member arranged in parallel with each other and having a plurality of light interception sections and light transmission sections formed thereon alternately. The vertical position of the movable member are changed electrostatically relative to the fixed member to adjust the light transmittance of the windowpane. Each light interception section has a semi-interception region, the light transmittance of which decreases gradually from a center region thereof toward the adjacent light transmission section. The semi-interception region of the light interception section of a light interception plate of the fixed member overlap the semi-interception region of the light interception section of a light interception plate of the movable member, thus accomplishing an optical interception completely.

22 Claims, 28 Drawing Sheets

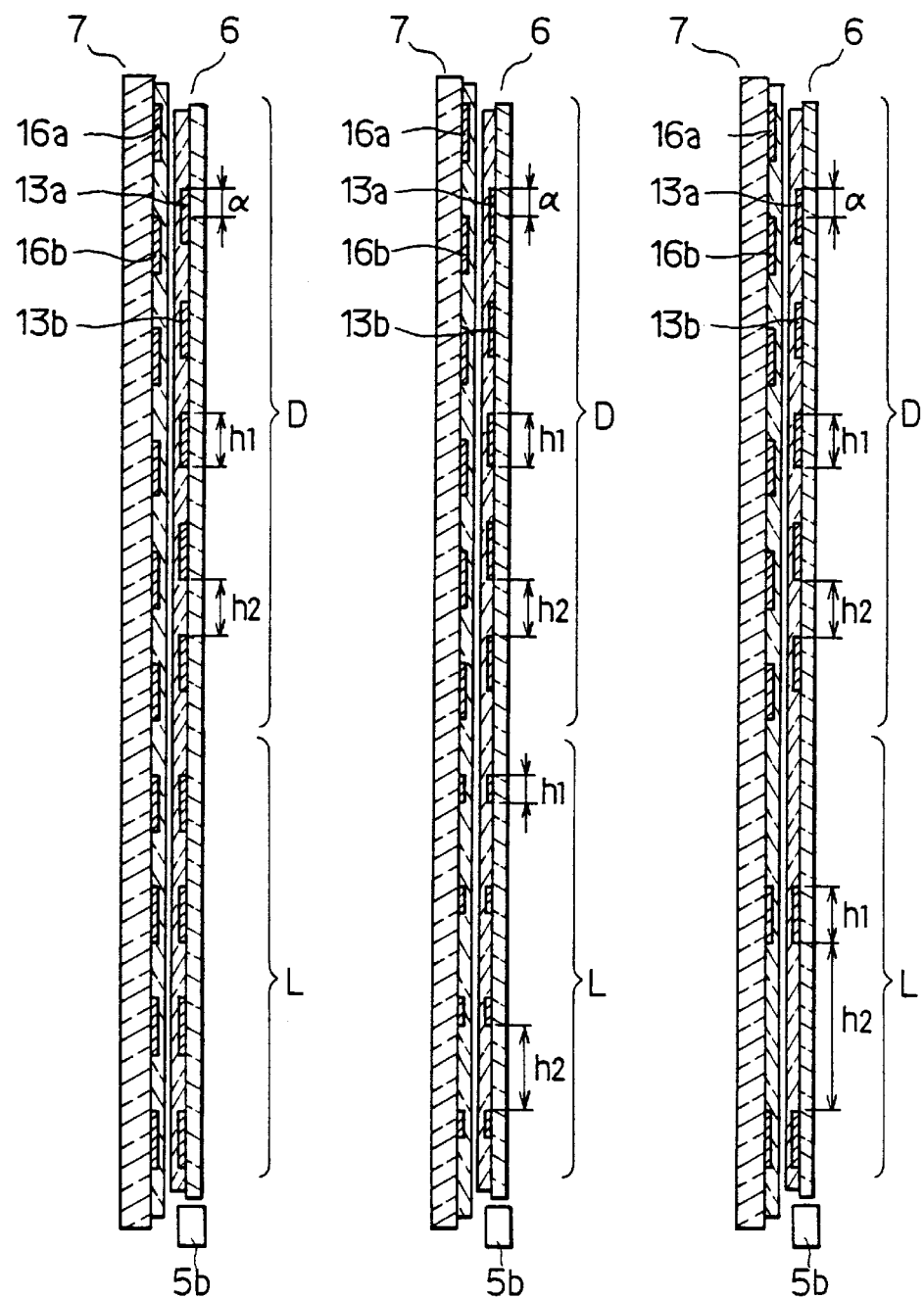

FIG. 34A
FIG. 34B
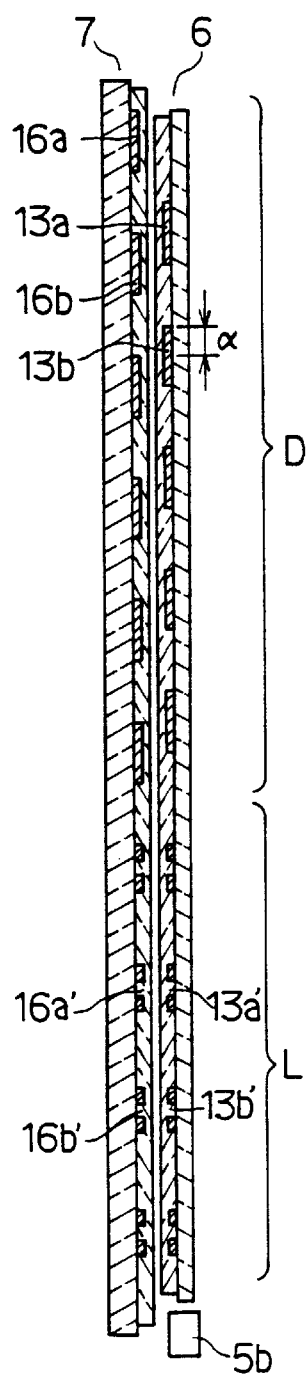
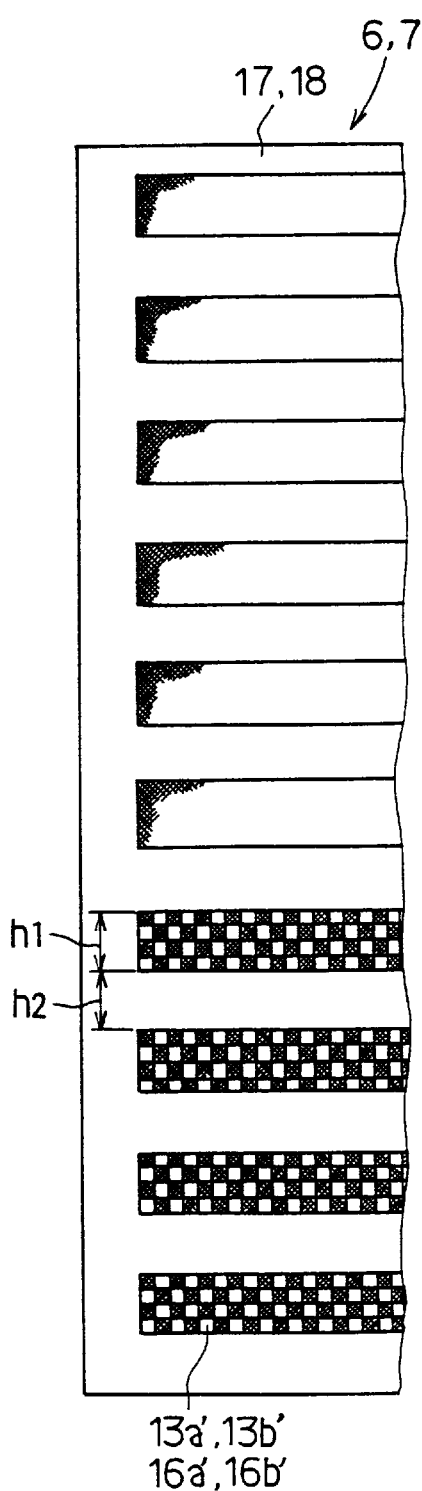

LIGHT TRANSMITTANCE ADJUSTING APPARATUS

This application is a continuation application of application Ser. No. 08/580,292 filed Dec. 28, 1995, now abandoned.

BACKGROUND OF THE INVENTION

1. Field of the Invention

The present invention relates to a light transmittance adjusting apparatus to be installed on a rear window, a side window or a sunvisor of automobiles or buildings such as stores or the like.

2. Description of Related Art

In recent years, there is a tendency for decreasing the light transmittance of the rear window of automobiles or windows of buildings to reduce the rate of the power consumption of air-conditioners in summer in particular. There are also cases in which characters, diagrams, patterns or marks are printed on the windowpanes or transparent films.

According to the light transmittance adjusting apparatus disclosed in Laid-Open Japanese Patent Publication No. 6-8730, the light transmittance of a windowpane is adjusted by displacing a plurality of plates from each other, the plates having non-transparent or light interception sections and transparent light transmission sections formed thereon parallelly and alternately with each other in a vertical direction. According to the light transmittance adjusting apparatus disclosed in Laid-Open Japanese Utility Model Publication No. 58-25218, the light transmittance of a windowpane is adjusted by displacing a pair of transparent plates from each other, the plates having a nontransparent light interception section on which a checkered pattern is formed.

These light transmittance adjusting apparatuses have the following disadvantages: If the parallelism or the positioning accuracy of the plates having the light interception sections and transparent light transmission sections formed thereon vertically is low, a gap is formed between the light interception sections horizontally opposed to each other in a light interception state, thus preventing the light transmittance from being reduced to a desired degree; or vertical ends of the light interception sections horizontally opposed to each other overlap with each other, thus forming a dense stripe in the light interception sections.

The light transmittance adjusting apparatus disclosed in Laid-Open Japanese Patent Publication No. 6-59201 has a complicated construction because it comprises an electrostatic actuator provided with a movable member and a fixed member and a pair of polarizing plates.

SUMMARY OF THE INVENTION

It is accordingly an object of the present invention to solve the conventional problems.

It is another object of the present invention to provide a light transmittance adjusting apparatus capable of adjusting the light transmittance of a windowpane and switching display contents of characters, diagrams, patterns or marks to each other or switching display to non-display and vice versa.

It is still another object of the present invention to provide a light transmittance adjusting apparatus capable of preventing gaps or stripes from being formed on the windowpane due to a low size accuracy or a low positioning accuracy.

It is a further object of the present invention to provide a light transmittance adjusting apparatus having a simple construction and a great difference in the light transmittance of the windowpane between a closed time and an open time.

According to the present invention, two light interception plates on which a plurality of transparent sections and nontransparent sections are formed alternately with each other are arranged in opposition to each other. The electrodes of the light interception plates are electrostatically moved relative to each other to control the light transmittance of a windowpane or the like.

Preferably, electrodes forms the transparent section or the nontransparent sections. A voltage of a fixed polarity is applied to the transparent section or the nontransparent sections, whereas a voltage, the polarity of which is inverse to the fixed polarity is applied to the transparent section or the nontransparent sections.

Preferably, visible information such as a picture or a character is formed on one of the light interception plates.

More preferably, the light interception plates are formed in such a manner that the light transmittance thereof changes gradually at each border between the nontransparent section and the transparent section.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 33A, 33B and 33C are sectional views showing a light transmittance adjusting apparatus according to a ninth, tenth and eleventh embodiments of the present invention, respectively; and FIGS. 34A and 34B are a sectional view showing a light transmittance adjusting apparatus according to a twelfth embodiment of the present invention and a partial plan view showing the construction of a movable member and that of a fixed member in the twelfth embodiment, respectively.

DETAILED DESCRIPTION OF EXEMPLARY EMBODIMENTS

A light transmittance adjusting apparatus according to presently preferred exemplary embodiments of the present invention is described below.

Figure 1:
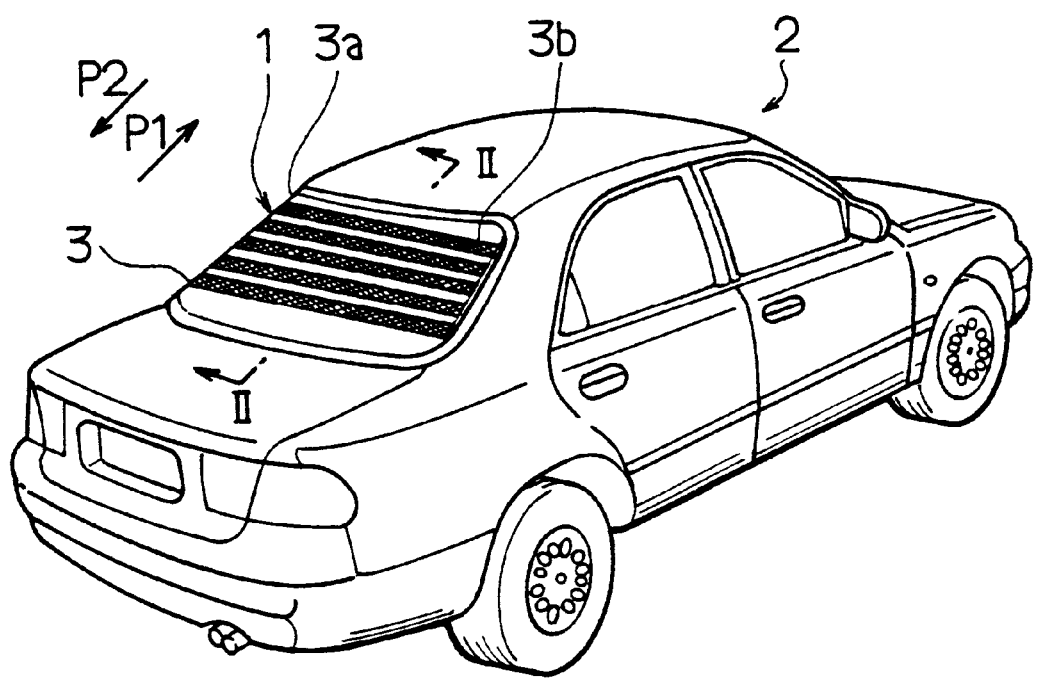
FIG. 1 is a perspective view showing an automobile provided with a light transmittance adjusting apparatus according to the present invention.
Figure 2:
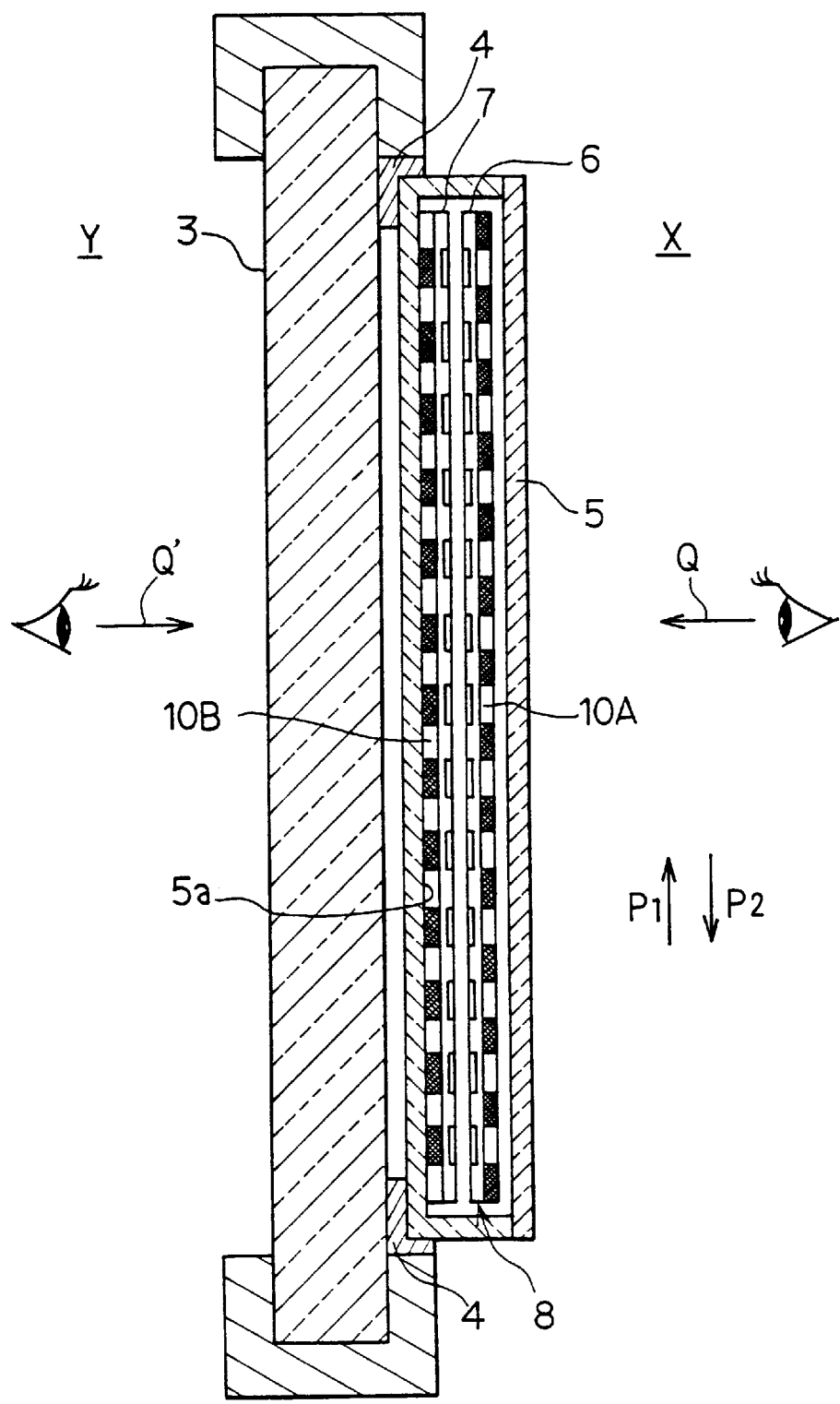
FIG. 2 is a sectional view, showing the light transmittance adjusting apparatus, taken along a line II—II of FIG. 1.

A light transmittance adjusting apparatus 1 which provides transparent sections 3a and nontransparent sections 3b alternately is mounted on a rear window 3 of an automobile 2. As shown in FIG. 2, the apparatus 1 comprises a transparent casing 5, made of resin, fixed to the rear window 3 made of transparent windshield glass by means of an installing member 4. The transparent casing 5 accommodates an electrostatic actuator 8 comprising a movable member 6 and a fixed member 7 facing the movable member 6; and light interception plates 10A and 10B. A reference symbol X of FIG. 2 denotes the interior of the automobile 2 and a reference symbol Y of FIG. 2 denotes the outside of the automobile 2.

As shown in FIG. 2, the light interception plate 10B is fixed to the inner face 5a of the transparent casing 5, at the outer side (Y) thereof. The fixed member 7 of the electrostatic actuator 8 is fixed to the light interception plate 10B. The light interception plate 10A is fixed to the movable member 6 of the electrostatic actuator 8 at the inner side thereof so as to move the light interception plate 10A vertically together with the movable member 6, in up and down directions shown by arrows P1 and P2.

Figure 3:
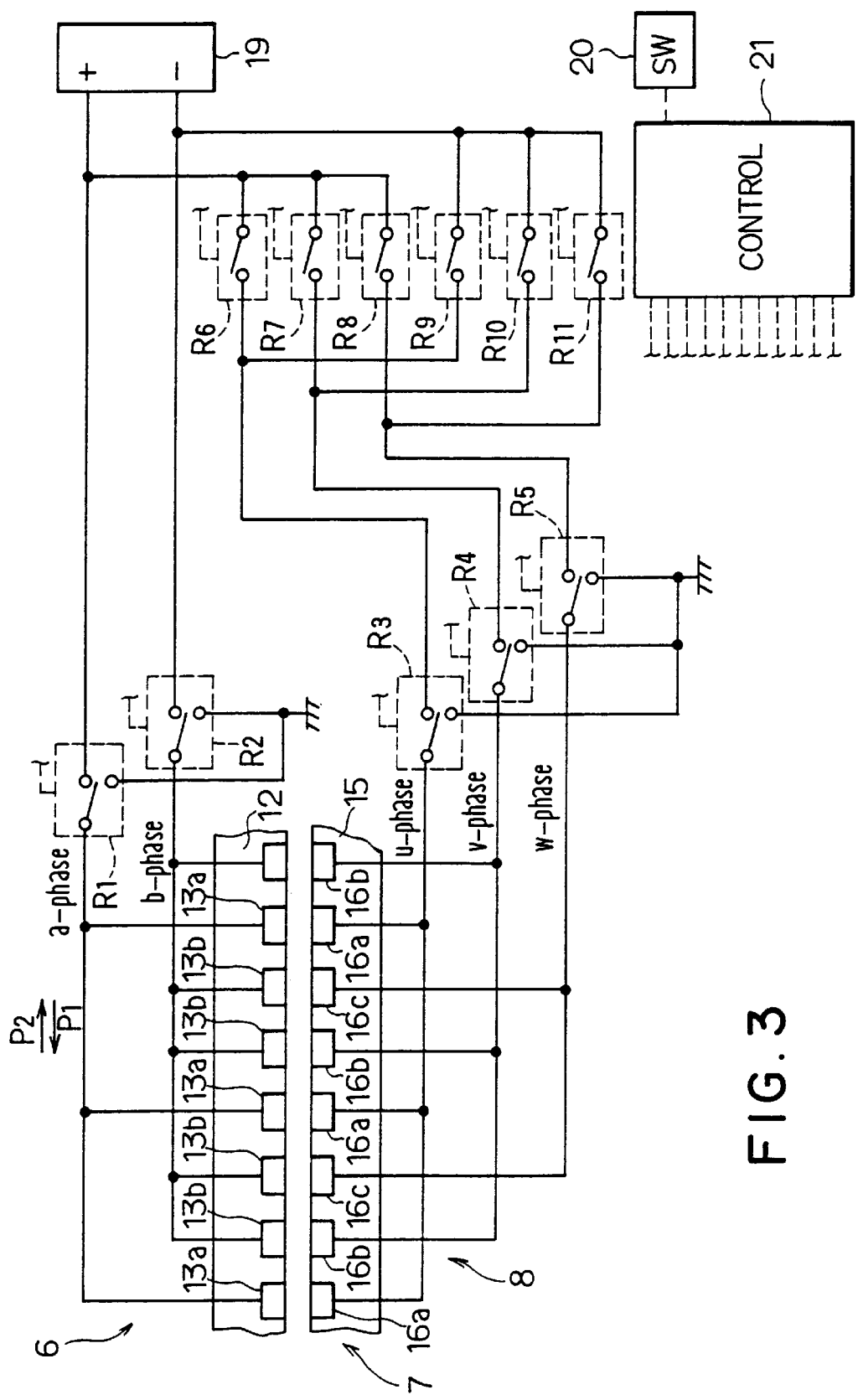
FIG. 3 is a schematic circuit diagram showing an electrostatic actuator.

As shown in FIG. 3, the movable member 6 has a plurality of comb-shaped transparent electrodes 13a (a-phase) and 13b (b-phase) mounted on a transparent insulation film or plate 12, while the fixed member 7 of the electrostatic actuator 8 has a plurality of comb-shaped transparent electrodes 16a, 16b, and 16c mounted on a transparent insulation film or plate 15. The number of the transparent electrodes 16a, 16b, and 16c is equal to each other. The transparent electrodes 16a are connected with each other to form a U-phase; the transparent electrodes 16b are connected with each other to form a V-phase; and the transparent electrodes 16c are connected with each other to form a W-phase.

The transparent electrodes 13a and 13b of the fixed member 7 are connected with a power source 19 having a high voltage through relays R1 and R2. In driving the light transmittance adjusting apparatus, a positive (hereinafter referred to as "+") high voltage is fixedly applied to the transparent electrode 13a having the a-phase, while a negative (hereinafter referred to as "−") high voltage is fixedly applied to the transparent electrode 13b having the b-phase.

The transparent electrodes 16a through 16c of the fixed member 7 are connected with the power source 19 through relays R3 through R11. In driving the light transmittance adjusting apparatus, the relays R3 through R11 are switched on and off intermittently to apply the high voltage to the transparent electrodes 16a, 16b, and 16c in electrically three-phase (i.e., the U-phase, V-phase, and W-phase) respectively by changing the polarity of the high voltage to be applied thereto.

In moving the movable member 6 upward as shown by the arrow P1, supposing that a high voltage is repeatedly applied to the transparent electrodes 16a having the U-phase at equal intervals in the order of "+", "+", and "−", the high voltage is repeatedly applied to the transparent electrodes 16b having the V-phase and the transparent electrodes 16c having the W-phase by advancing the phase of the transparent electrodes 16a by one step and two steps, respectively at the equal intervals. Similarly, in moving the movable member 6 downward as shown by the arrow P2, the high voltage is repeatedly applied to the transparent electrodes 16b having the V-phase and the transparent electrodes 16c having the W-phase by delaying the phase of the transparent electrodes 16a by one step and two steps, respectively at the equal intervals. Reference numeral 20 shown in FIG. 3 denotes a manual operation switch provided in proximity to a driver's seat. Based on the manual setting of the operation switch 20, a control section 21 switches the relays R1 through R11 on and off to control the high voltage to be applied to the transparent electrodes 13a and 13b of the movable member 6 and the transparent electrodes 16a through 16c of the fixed member 7.

Figure 4A:
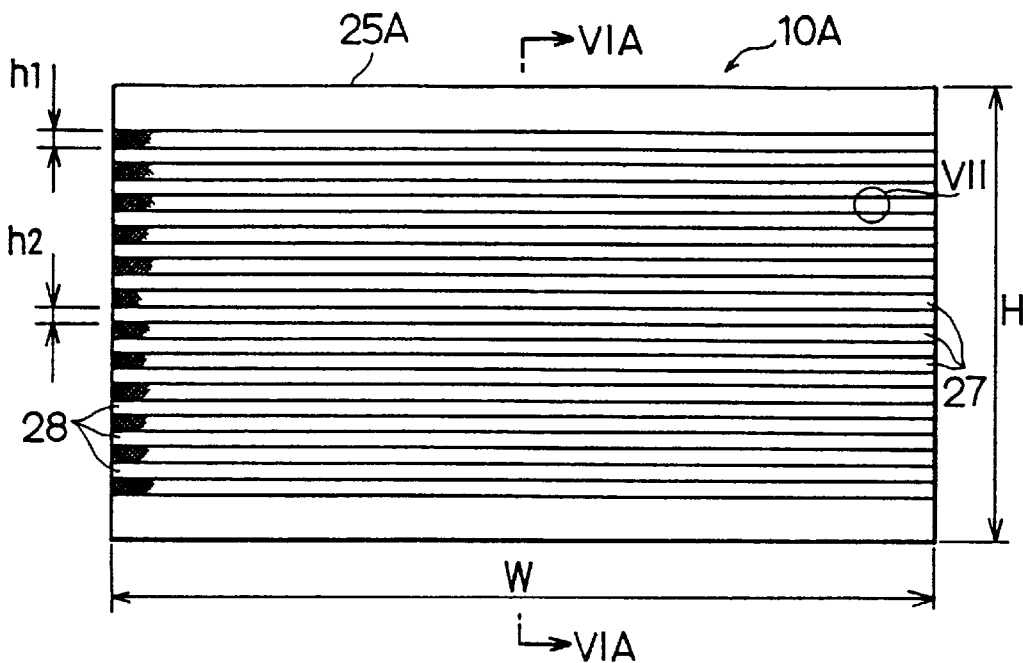
FIGS. 4A and 4B are front views showing a light interception plate according to a first embodiment, respectively.
Figure 4B:
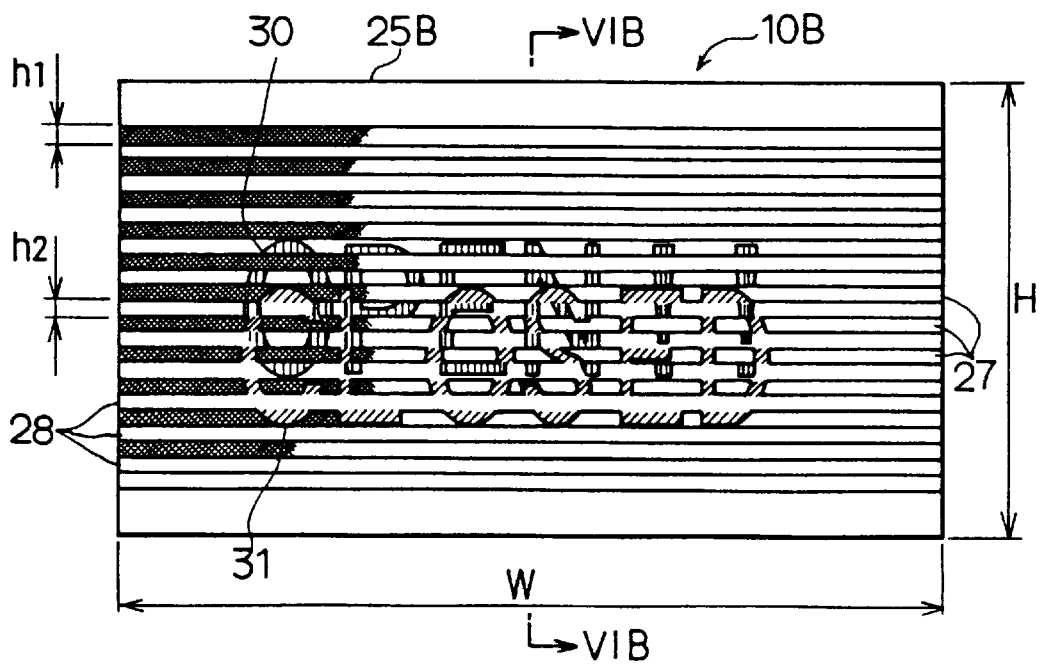
Figure 5A:
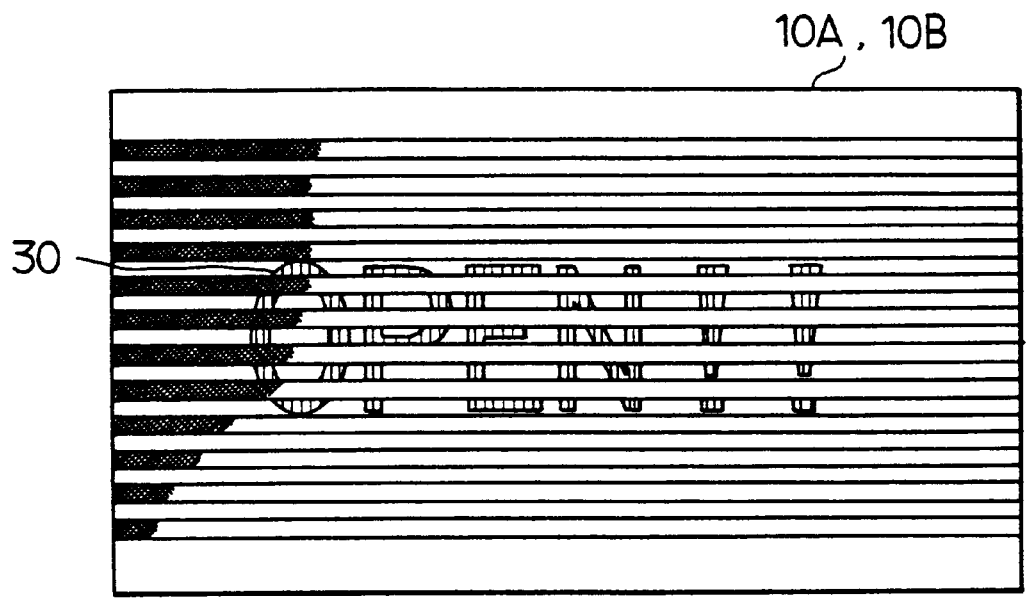
FIGS. 5A and 5B are front views showing a light transmission and light interception states according to the first embodiment, respectively.
Figure 5B:
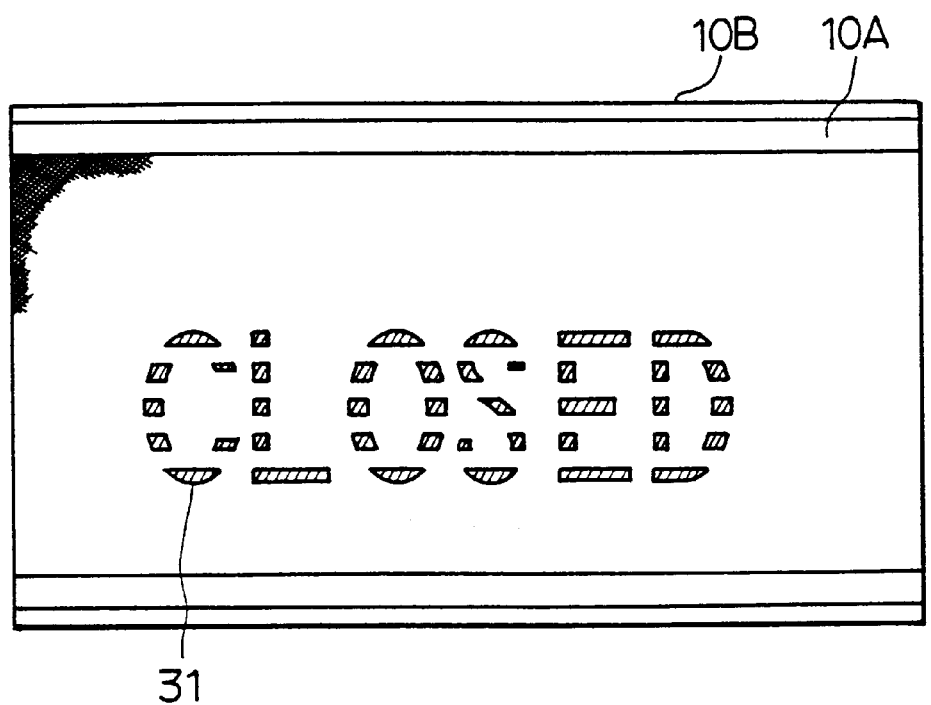

The construction of the light interception plate 10A and that of the light interception plate 10B are shown in FIGS. 4A and 4B, respectively. As will be described later, a character "OPEN!!" is displayed on the light interception plates 10A and 10B in a light transmission time as shown in FIG. 5A, while a character "CLOSED" is displayed thereon in a light interception time as shown in FIG. 5B. FIGS. 4A, 4B, 5A, and 5B show the light interception plates 10A and 10B when the rear window 3 is viewed from the interior X in the direction shown by an arrow (Q) of FIG. 2.

Referring to FIG. 4, the light interception plate 10A fixed to the inner side of the movable member 6 of the electrostatic actuator 8 is rectangular. The light interception plate 10A has a transparent substrate 25A, the width (W) of which is almost equal to that of the rear window 3 and the height (H) of which is set to a height required to adjust the light transmittance of the rear window 3. The substrate 25A is composed of a thin transparent resin film, the light transmittance of which is almost 100%.

Figure 6A:
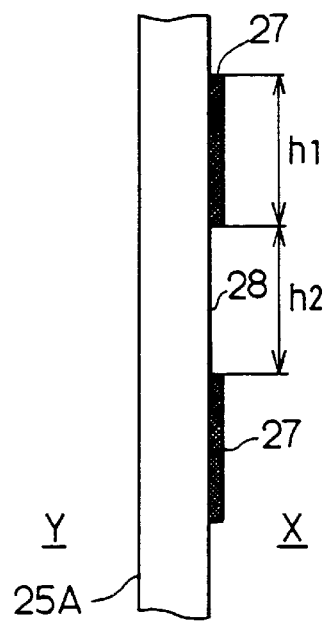
FIGS. 6A and 6B are partially enlarged sectional views, showing the light interception plate, taken along lines VIA—VIA of FIG. 4A and VIB—VIB of FIG. 4B, respectively.

As shown in FIG. 6A, black ink is printed on the substrate 25A to form a plurality of light interception sections 27 thereon at regular intervals. It is to be noted that the black-colored portion is shown only partly for brevity in the figures without blackening the whole area of such portion. The width of each light interception sections 27 is equal to the width (W) of the substrate 25A. The interception sections 27 have the same or uniform height h1. A transparent light transmission section 28, the light transmittance of which is almost 100% is formed at a portion, not printed in black, between the adjacent light interception sections 27. Similarly to the light interception section 27, each light transmission section 28 has a width almost equal to the width (W) of the substrate 25A and has the height h2. In the first embodiment, although the height h1 of the light interception section 27 is set to be almost equal to the height h2 of the light transmission section 28, the height h1 of the light interception section 27 may be set to be a little greater than the height h2 of the light transmission section 28.

Figure 7:
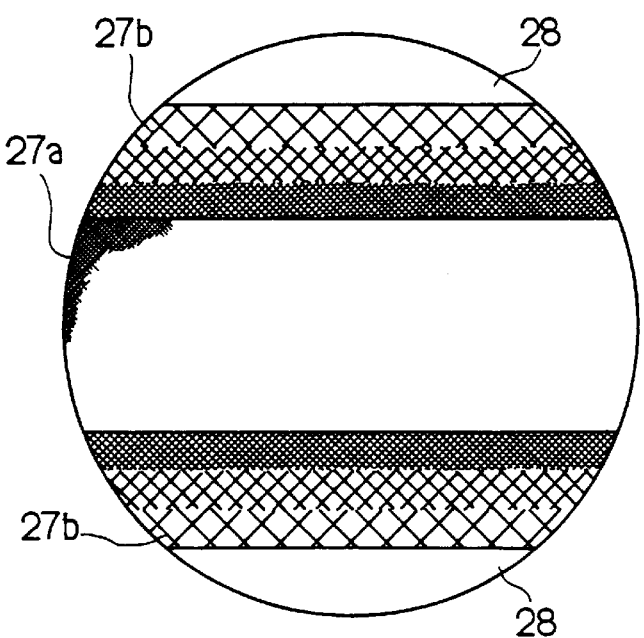
FIG. 7 is an enlarged view showing the construction of a light interception section.

As shown in FIG. 7 enlargingly indicating a portion, of the light interception section 27, denoted as VII in FIG. 4, black ink is printed solidly on a center region 27a of the light interception section 27 so that the light transmittance thereof is 0% (nontransparent). A semi-interception or semi-transparent region 27b is formed in the region between the center region 27a and the light transmission section 28. In the semi-interception region 27b, the density of black is set to be gradually thinner from the center region 27a toward the light transmission section 28. The semi-interception region 27b has a net-shaped pattern. More specifically, the mesh size of the portion of the semi-interception region 27b adjacent to the center region 27a is set to be fine to set the density of black to be almost equal to the solid black of the center region 27a. Thus, the light transmittance of the semi-interception region 27b is almost 0%. The mesh size of the semi-interception region 27b is set to be gradually larger from the portion adjacent to the center region 27a toward the periphery of the light interception section 27 to set the density of black gradually thinner in this direction. Thus, the light transmittance of the semi-interception region 27b becomes gradually higher from the portion adjacent to the center region 27a toward the light transmission section 28.

Figure 6B:
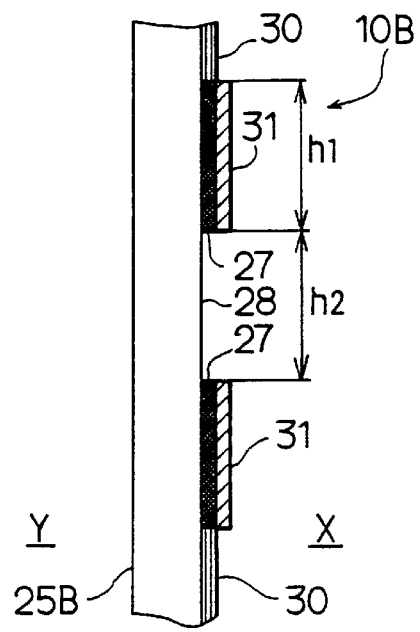

The light interception plate 10B fixed to the inner face 5a, of the transparent casing 5, at the outer side (Y) thereof has a transparent substrate 25B. The transparent substrate 25B has the same size as that of the substrate 25A of the light interception plate 10A and is made of a thin transparent resin film, the light transmittance of which is set to almost 100%. As shown in FIG. 6B, as in the case of the substrate 25A of the light interception plate 10A, the substrate 25B of the light interception plate 10B has a plurality of light interception sections 27, having the same height h1, formed thereon at regular intervals and a plurality of light-transmission sections 28, having the same height h2, formed thereon at regular intervals in alternation with the light interception sections 27. The height of the light interception section 27 of the light interception plate 10B is set to be equal to the height h1 of the light interception section 27 of the light interception plate 10A. Similarly, the height of the light transmission section 28 of the light interception plate 10B is set to be equal to the height h2 of the light transmission section 28 of the light interception plate 10A. As in the case of the light interception plate 10A, as shown in FIG. 7, black ink is printed solidly on the center region 27a of the light interception section 27 so that the light transmittance thereof is 0% (nontransparent); and in the light semi-interception portion semi-interception region 27b between the center region 27a and the light transmission section 28, the density of black is set to be gradually thinner from the center region 27a toward the light transmission section 28.

The character "OPEN!!" 30 to be displayed in the light transmission time is printed or painted on the substrate 25B of the light interception plate 10B, while the character "CLOSED" 31 to be displayed in the light interception time is printed on light interception section 27.

The character "OPEN!!" 30 to be displayed in the light transmission time is formed by printing red ink solidly on the substrate 25B at portions thereof corresponding to the light transmission sections 28. At this time, the red ink is not printed on the light interception sections 27. Thus, the red character "OPEN!!" 30 is blank at portions thereof corresponding to the light interception sections 27.

The character "CLOSED" 31 to be displayed in the light interception time is formed by printing grey ink solidly on the light interception sections 27. At this time, the grey ink is not printed at portions, of the substrate 25B, corresponding to the light transmission sections 28. Thus, the grey-colored character "CLOSED" 31 is blank at portions thereof corresponding to the light transmission sections 28.

The operation of the light transmittance adjusting apparatus of the first embodiment is described below.

When the electrostatic actuator 8 is driven, the light interception plate 10A fixed to the movable member 6 is moved vertically as shown by the arrows P1 and P2 of FIG.

Figure 8A:
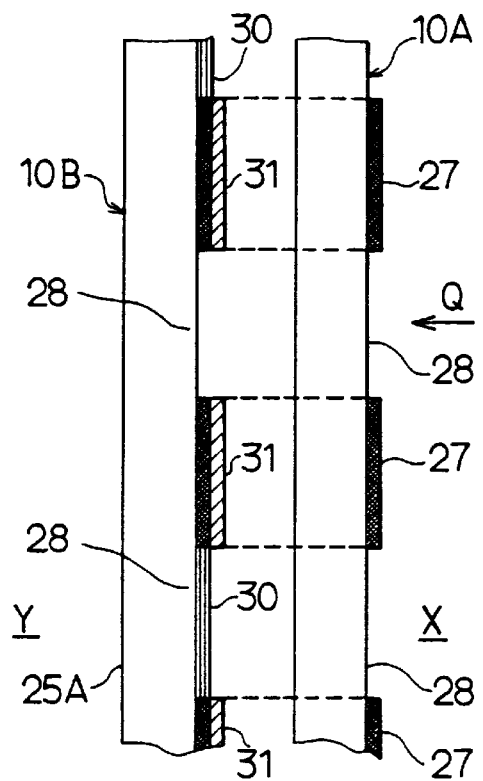
FIGS. 8A and 8B are partially enlarged sectional views showing a light transmission and light interception states according to the first embodiment, respectively.

2, with the light interception plate 10A kept in parallel with the light interception plate 10B fixed to the transparent casing 5. As a result, as shown in FIGS. 5A and 8A, the light interception section 27 of the light interception plate 10A and the light interception section 27 of the light interception plate 10B align with each other, and the light transmission section 28 of the light interception plate 10A and the light transmission section 28 of the light interception plate 10B align with each other to obtain the maximum light transmittance (light transmission state, i.e., light transmission time) of the rear window 3.

As described above, the character "OPEN!!" 30 is formed by printing the red ink solidly on the light transmission sections 28 of the light interception plate 10B. Therefore, when the light transmission section 28 of the light interception plate 10A and that of the light interception plate 10B align with each other in the light transmission time, the character 30 can be seen inside the automobile 2 as shown by the arrow Q of FIG. 2. The character "CLOSED" 31 is formed by printing the grey ink solidly on the light interception sections 27 of the light interception plate 10B. Therefore, when the light transmission section 28 of the light interception plate 10A and that of the light interception plate 10B align with each other in the light transmission time, the character "CLOSED" 31 cannot be seen inside the automobile 2 as shown by the arrow Q of FIG. 2, because the character "CLOSED" 31 is intercepted by the light interception section 27 of the light interception plate 10A. Accordingly, in the light transmission time, only the character "OPEN!!" 30 is seen inside the automobile 2.

Figure 8B:
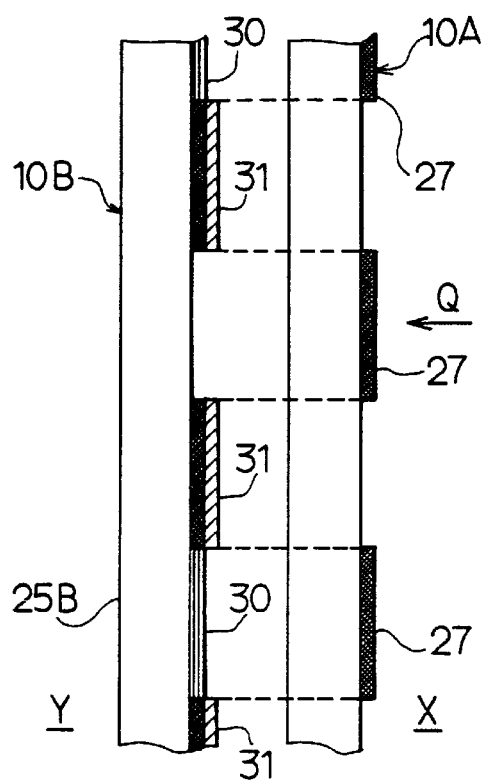

When the electrostatic actuator 8 is driven in the light transmission state, the light interception plate 10A fixed to the movable member 6 is moved downward as shown by the arrow P2 of FIG. 2. As a result, as shown in FIGS. 5B and 8B, the light interception section 27 of the light interception plate 10A and the light transmission section 28 of the light interception plate 10B align with each other, and the light transmission section 28 of the light interception plate 10A and the light interception section 27 of the light interception plate 10B align with each other to obtain the minimum light transmittance (light interception state, i.e., light interception time) of the rear window 3.

As described above, the character "CLOSED" 31 is formed by printing the grey ink solidly on the light interception sections 27 of the light interception plate 10B. Therefore, when the light interception section 27 of the light interception plate 10B and the light transmission section 28 of the light interception plate 10A align with each other in the light interception time, the character 31 can be seen inside the automobile 2 as shown by the arrow Q of FIG. 2. The character "OPEN!!" 30 is formed by printing the red ink solidly on the light transmission sections 28 of the light interception plate 10B. Therefore, when the light transmission section 28 of the light interception plate 10B and the light interception section 27 of the light interception plate 10A align with each other in the light interception time, the character "OPEN!!" 30 cannot be seen inside the automobile 2 as shown by the arrow Q of FIG. 2, because the character "OPEN!!" 30 is intercepted with the light interception section 27 of the light interception plate 10A. Accordingly, in the light interception time, only the character "CLOSED" 31 is seen inside the automobile 2.

As described above, in the light transmittance adjusting apparatus of the first embodiment, the light transmittance of the rear window 3 is adjusted in both the light transmission state and the light interception state. In addition, the character "OPEN!!" 30 is displayed as a visible information in the light transmission state, while the character "CLOSED" 31 is displayed as the visible information in the light interception state.

Figure 9A:
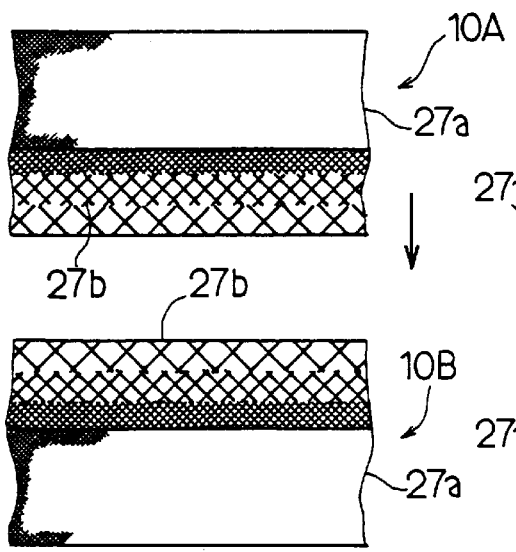
FIGS. 9A and 9B are partially enlarged sectional views showing a relationship between two light interception sections opposed to each other in a light transmission and light interception states, respectively.
Figure 9B:
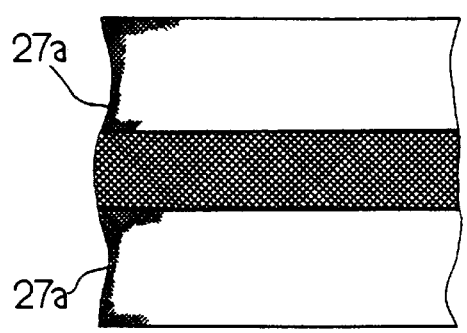

As described above, each of the light interception sections 27 formed on the light interception plates 10A and 10B alternately with the light transmission sections 28 has the semi-interception region 27b, formed at both sides of the center region 27a, the light transmittance of which is almost 0%. The density of the semi-interception region 27b is set to be gradually thinner (i.e., more transparent) from the center region 27a toward the light transmission section 28. Thus, in the light interception state, the semi-interception region 27b of the light interception section 27 of the light interception plate 10A approaches the semi-interception region 27b of the corresponding light interception section 27 of the light interception plate 10B, thus overlapping each other, as shown in FIG. 9B. Thus, when the rear window 3 is viewed in the light interception state, the light transmittance of the semi-interception region 27b of each light interception section 27 becomes almost equal to that of the center region 27a. Consequently, the semi-interception regions 27b opposed to each other intercepts light beams completely. Even if the light interception plate 10A is dislocated slightly from the predetermined position in the light interception state, the light transmission section 28 is not seen in the form a stripe in the region between the light interception sections 27 opposed to each other, because both semi-interception regions 27b keep overlapping each other. If the light interception plate 10A is dislocated slightly from the predetermined position in the light interception state, both semi-interception regions 27b overlap each other, whereas both center regions 27a do not overlap each other. Therefore, a dense stripe is not seen in the light interception state. Thus, in the first embodiment, even though the light interception plate 10A is not placed in position with high accuracy or the interception plates 10A and 10B have a low parallelism, neither gaps nor stripes are generated in the light interception state.

A light transmittance adjusting apparatus according to a second embodiment is described below with reference to FIGS. 10A, 10B, 11A, and 11B.

Figure 10A:
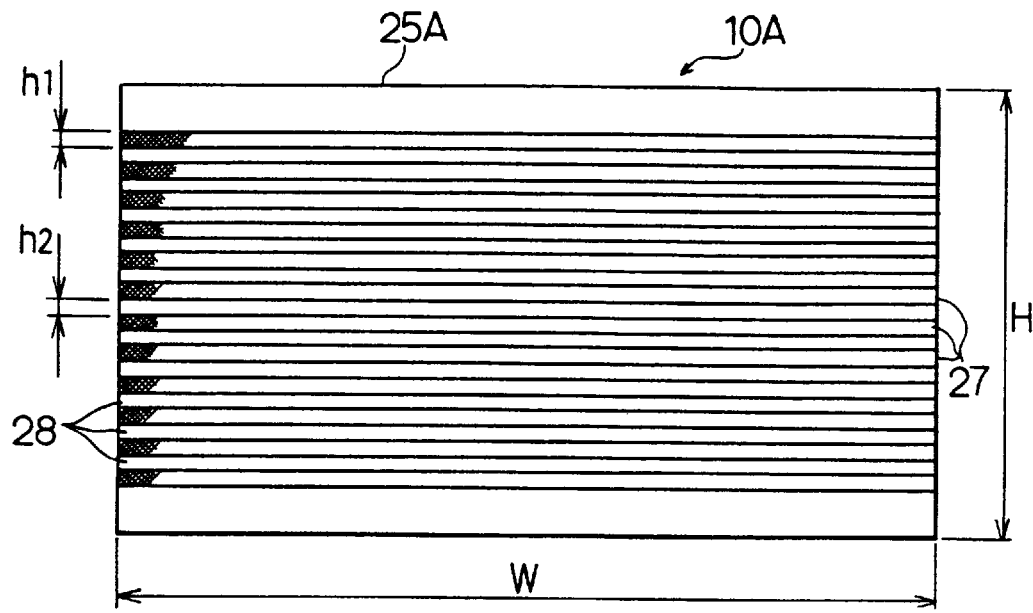
FIGS. 10A and 10B are front views each showing a light interception state according to a second embodiment, respectively.
Figure 10B:
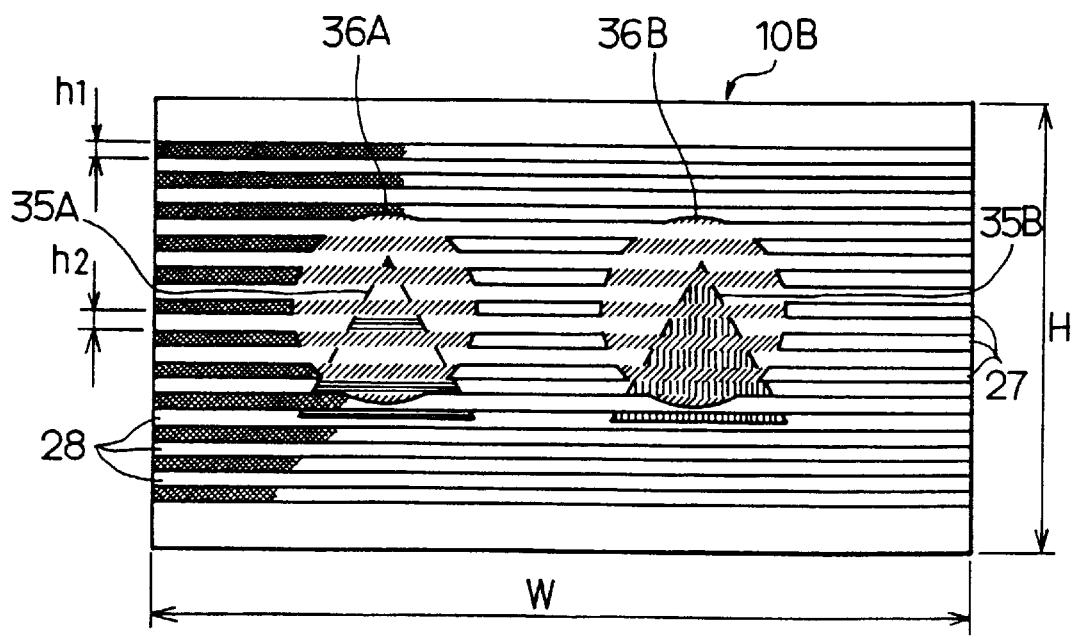
Figure 11A:
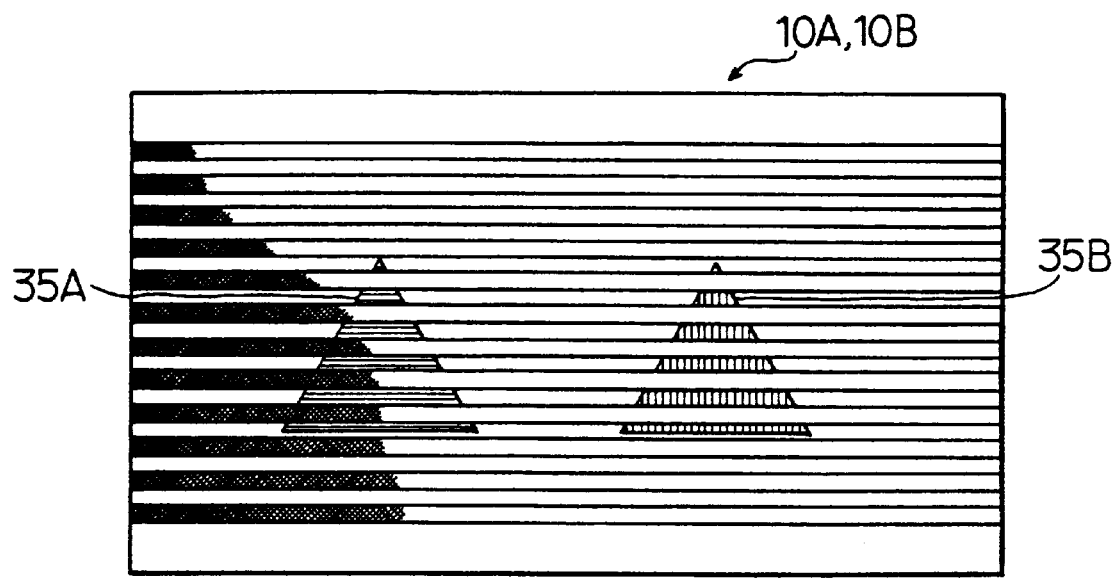
FIGS. 11A and 11B are front views showing a light transmission and light interception states according to the second embodiment, respectively.
Figure 11B:
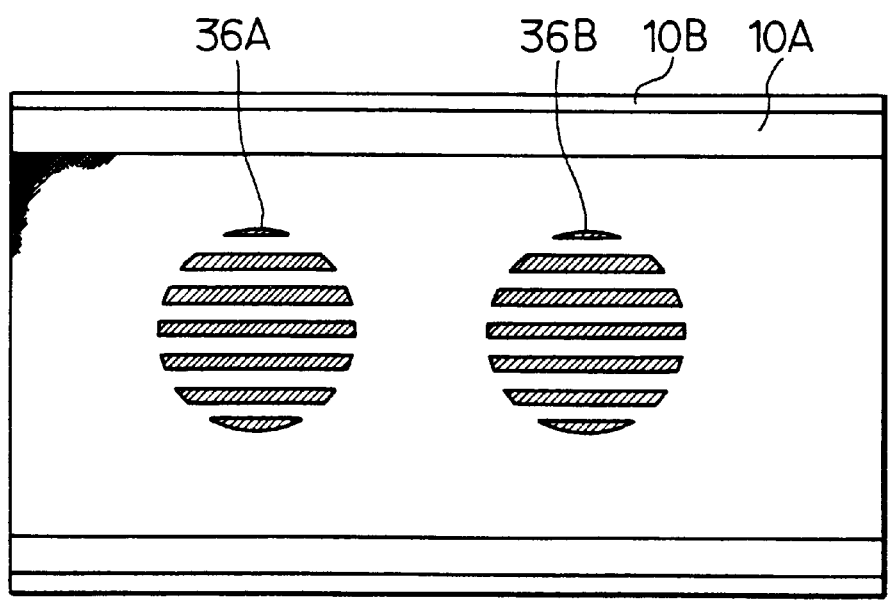

The construction of the light interception plate 10A and that of the light interception plate 10B are as shown in FIGS. 10A and 10B, respectively. In the light transmission time, a diagram 35A of a blue triangle and a diagram 35B of a red triangle are displayed as shown in FIG. 11A, while in the light interception time, diagrams 36A and 36B of a grey circle are displayed as shown in FIG. 11B. The construction of the light transmittance adjusting apparatus of the second embodiment is the same as that of the light transmittance adjusting apparatus of the first embodiment, except the construction of the light interception plates 10A and 10B.

Referring to FIG. 10A, the light interception plate 10A fixed to the inner side of the movable member 6 has the same construction as that of the light interception plate 10A of the first embodiment. That is, the light interception plate 10A comprises the transparent substrate 25A on which the light interception sections 27 and the light interception sections 28 are formed alternately with each other. The construction of the light interception section 27 of the light interception plate 10A is identical to that of the light interception section 27 of the light interception plate 10A of the first embodiment. That is, the light interception section 27 has the semi-interception region 27b formed in the region between the center region 27a printed in solid black and the light transmission section 28. The light transmittance of the semi-light interception region semi-interception region 27b gradually increases from the center region 27a toward the light transmission section 28.

The light interception plate 10B fixed to the inner face 5a, of the transparent casing 5, at the outer side (Y) thereof comprises the transparent substrate 25A on which the light interception sections 27 and the light interception sections 28 are formed alternately with each other, similarly to the light interception plate 10B of the first embodiment. The light interception section 27 has the semi-interception region 27b formed in the region between the center region 27a printed in solid black and the light transmission section 28. The density of the black of the semi-interception region 27b gradually decreases from the center region 27a toward the light transmission section 28.

The diagram 35A of the blue triangle and the diagram 35B of the red triangle to be displayed in the light transmission time are formed by printing red and blue ink on the transparent substrate 25B, while the diagrams 36A and 36B to be displayed in the light interception time are formed by printing grey ink on the light interception sections 27.

The diagrams 35A and 35B each consisting of the triangle to be displayed in the light transmission time are formed by solidly printing red and blue ink, respectively on the transparent substrate 25B at portions thereof corresponding to the light transmission sections 28. At this time, the grey ink is not printed on the light interception sections 27. Thus, the diagrams 35A and 35B are blank at portions thereof corresponding to the light interception sections 27.

The diagrams 36A and 36B to be displayed in the light interception time are formed by printing the grey ink solidly on the light interception sections 27. At this time, the grey ink is not printed at portions, of the substrate 25B, corresponding to the light transmission sections 28. Thus, the diagrams 36A and 36B are blank at portions thereof corresponding to the light transmission sections 28.

As shown in FIG. 11A, in the light transmission state, namely, when the light interception section 27 of the light interception plate 10A and the light interception section 27 of the light interception plate 10B align with each other, and the light transmission section 28 of the light interception plate 10A and the light transmission section 28 of the light interception plate 10B align with each other, the diagrams 35A and 35B formed by printing the blue and red ink solidly on the light transmission sections 28 of the light interception plate 10B can be seen inside the automobile 2. The diagrams 36A and 36B is formed by printing the grey ink solidly on the light interception sections 27 of the light interception plate 10B. Therefore, the diagrams 36A and 36B cannot be seen inside the automobile 2 because the diagrams 36A and 36B are intercepted by the light interception section 27 of the light interception plate 10A. Accordingly, in the light transmission time, only the diagrams 35A and 35B are seen inside the automobile 2.

As shown in FIG. 11B, in the light interception state, namely, when the light interception section 27 of the light interception plate 10A and the light transmission section 28 of the light interception plate 10B align with each other, and the light transmission section 28 of the light interception plate 10A and the light interception section 27 of the light interception plate 10B align with each other, the diagrams 36A and 36B formed by printing the grey ink solidly on the light interception sections 27 of the light interception plate 10B can be seen inside the automobile 2. The diagrams 35A and 35B formed by printing the blue and red ink solidly on the light transmission sections 28 of the light interception plate 10B cannot be seen inside the automobile 2 because they are intercepted by the light interception section 27 of the light interception plate 10A. Accordingly, in the light interception time, only the diagrams 36A and 36B are seen inside the automobile 2.

As described above, in the light transmittance adjusting apparatus of the second embodiment, the optical light transmittance of the rear window 3 is adjusted in both the light transmission state and the light interception state. Further, the diagrams 35A and 35B are displayed in the light transmission state, while the diagrams 36A and 36B are displayed in the light interception state.

Furthermore, as described above, each of the light interception sections 27 formed on the light interception plates 10A and 10B alternately with the light transmission sections 28 has the center region 27a printed in solid black and the semi-interception region 27b, the light transmittance of which gradually increases from the portion thereof adjacent to the center region 27a toward the light transmission section 28. Thus, even though the light interception plate 10A is unaligned with the light interception plate 10B, a gap or a stripe can be prevented from being generated on the rear window 3 in the transmission state.

A light transmittance adjusting apparatus according to a third embodiment is described below with reference to FIGS. 12 through 15.

Figure 12A:
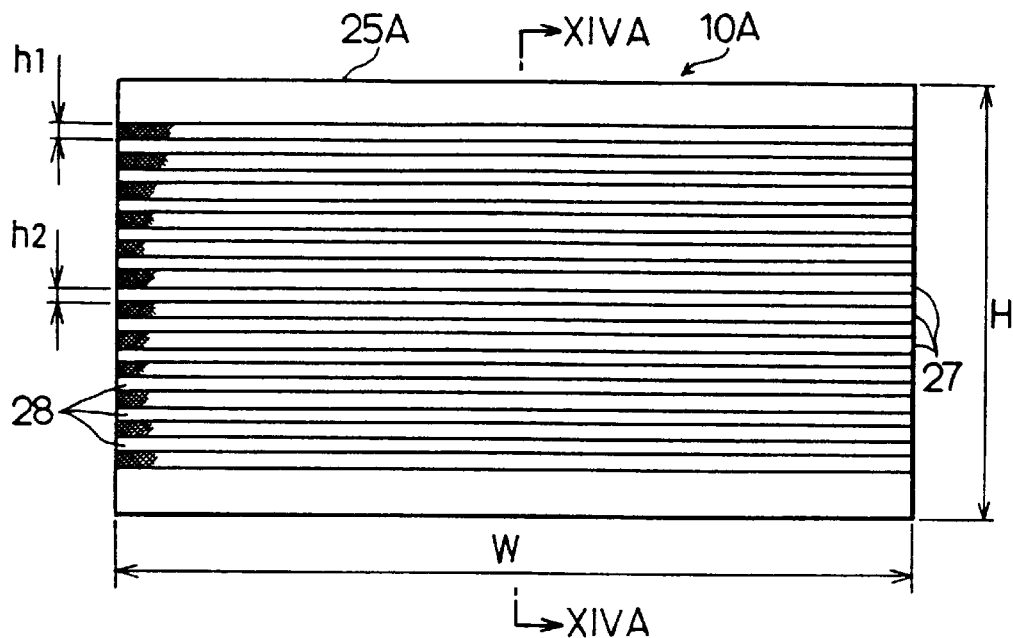
FIGS. 12A and 12B are front views each showing a light interception plate according to a third embodiment, respectively.
Figure 12B:
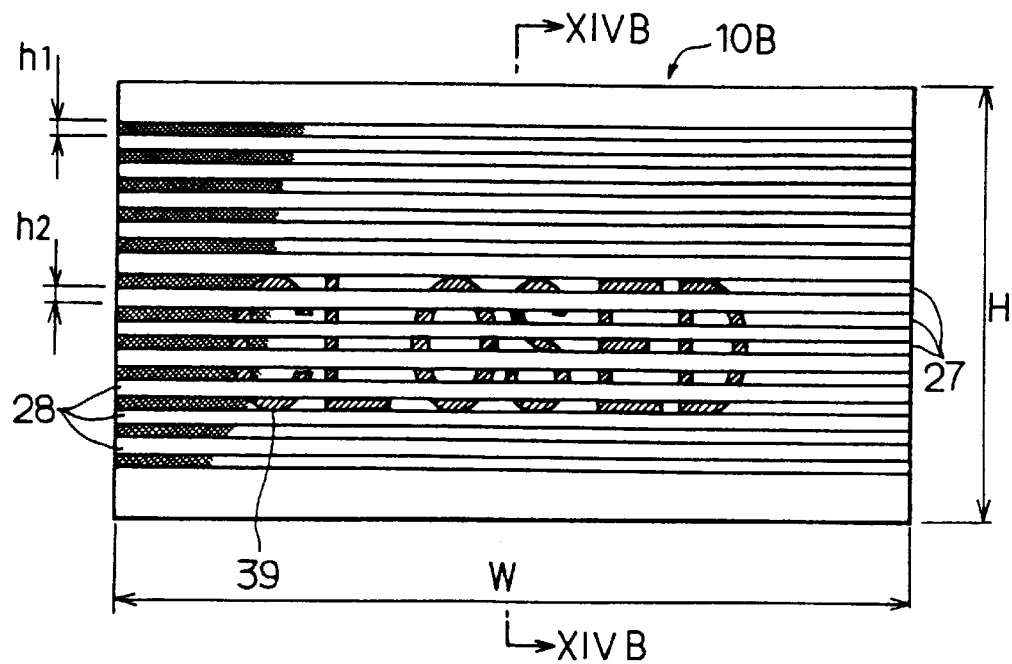
Figure 13A:
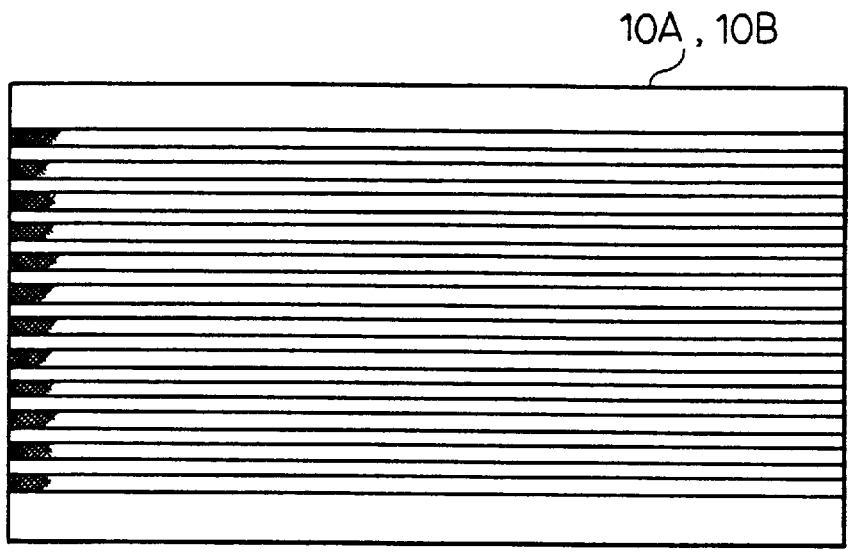
FIGS. 13A and 13B are front views showing a light transmission and light interception states according to the third embodiment, respectively.
Figure 13B:
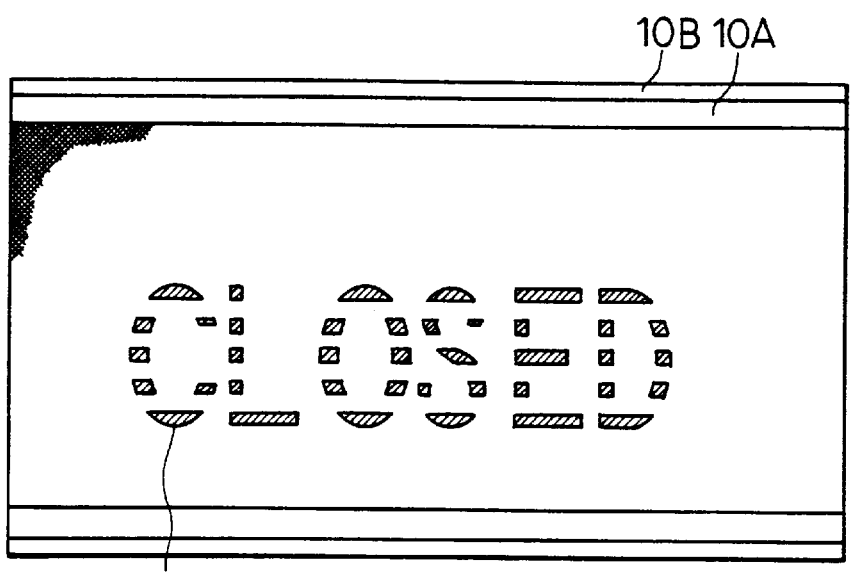

The construction of the light interception plate 10A and that of the light interception plate 10B are as shown in FIGS. 12A and 12B. No characters are displayed in the light transmission time as shown in FIG. 13A, whereas the character "CLOSED" 39 is displayed in the light interception time, as shown in FIG. 13B. The construction of the light transmittance adjusting apparatus of the third embodiment is the same as that of the light transmittance adjusting apparatus of the first embodiment except the construction of the light interception plates 10A and 10B.

Figure 14A:
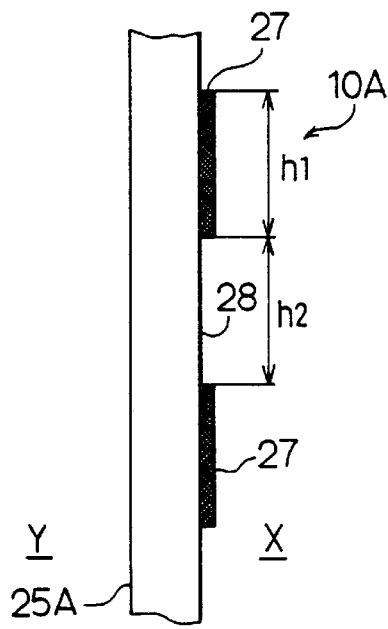
FIGS. 14A and 14B are partially enlarged sectional views, showing the light interception plate, taken along lines XIVA—XIVA of FIG. 12A and XIVB—XIVB of FIG. 12B, respectively.

Referring to FIGS. 12A and 14A, the light interception plate 10A fixed to the inner side of the movable member 6 has the same construction as that of the light interception plate 10A of the first embodiment. That is, the light interception plate 10A comprises the transparent substrate 25A on which the light interception sections 27 and the light interception sections 28 are formed alternately with each other. The construction of the light interception section 27 of the light interception plate 10A is also identical to that of the light interception section 27 of the light interception plate 10A of the first embodiment. That is, the light interception section 27 has the center region 27a printed in solid black and the semi-interception region 27b formed in the region between the center region 27a and the light transmission section 28. In the semi-interception region 27b, the density of black gradually decreases from the center region 27a toward the light transmission section 28.

Figure 14B:
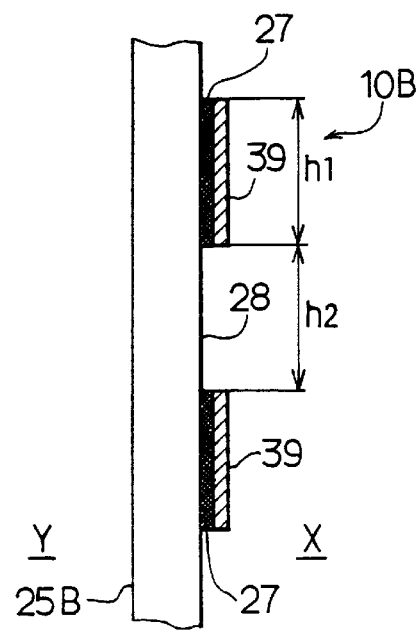

Referring to FIGS. 12B and 14B, the light interception plate 10B fixed to the inner face 5a, of the transparent casing 5, at the outer side (Y) thereof comprises the transparent substrate 25A on which the light interception sections 27 and the light interception sections 28 are formed alternately with each other, similarly to the light interception plate 10B of the first embodiment. Similarly to the light interception section 27 of the first embodiment, the light interception section 27 of the second embodiment has the center region 27a printed in solid black and the semi-interception region 27b formed in the region between the center region 27a and the light transmission section 28. In the semi-interception region 27b, the density of black gradually decreases from the center region 27a toward the light transmission section 28.

The character "CLOSED" 39 to be displayed in the light interception time is formed by printing grey ink solidly on the light interception sections 27. At this time, the grey ink is not printed on the substrate 25B at portions thereof corresponding to the light transmission sections 28. Thus, the character "CLOSED" 39 is blank at portions thereof corresponding to the light transmission sections 28 alternating with the light interception sections 27.

Figure 15A:
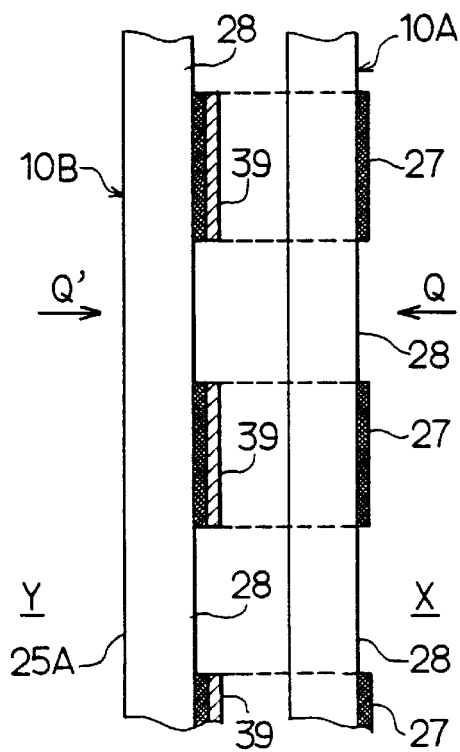
FIGS. 15A and 15B are partially enlarged sectional views showing a light transmission and light interception states according to the third embodiment, respectively.

Referring to FIGS. 13A and 15A, in the light transmission state, namely, when the light interception section 27 of the light interception plate 10A and the light interception section 27 of the light interception plate 10B align with each other, and the light transmission section 28 of the light interception plate 10A and the light transmission section 28 of the light interception plate 10B align with each other, the character "CLOSED" 39 formed by printing the grey ink solidly on the light interception sections 27 of the light interception plate 10B cannot be seen inside the automobile 2 because the character "CLOSED" 39 is intercepted by the light interception section 27 of the light interception plate 10A. Accordingly, no characters are displayed in the light transmission state.

Figure 15B:
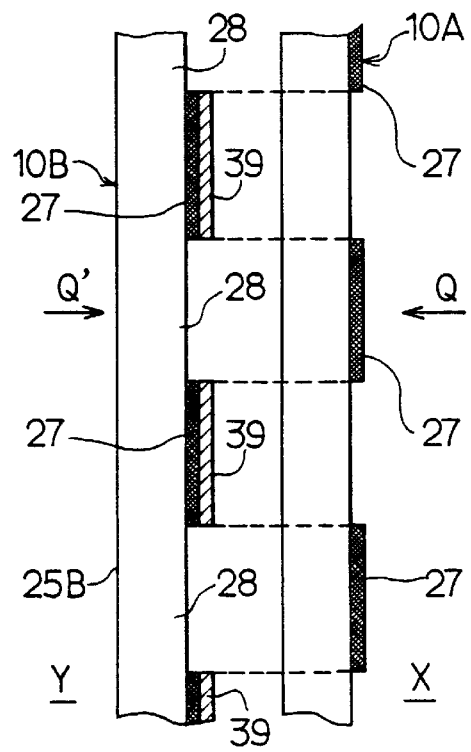

As shown in FIGS. 13B and 15B, in the light interception state, namely, when the light interception section 27 of the light interception plate 10A and the light transmission section 28 of the light interception plate 10B align with each other, and the light transmission section 28 of the light interception plate 10A and the light interception section 27 of the light interception plate 10B align with each other, the character "CLOSED" 39 formed by printing grey ink solidly on the light interception sections 27 of the light interception plate 10B can be seen inside the automobile 2.

As described above, in the light transmittance adjusting apparatus of the third embodiment, the light transmittance of the rear window 3 is adjusted in both the light transmission state and the light interception state; and no characters are displayed in the light transmission state, while the character "CLOSED" 39 is displayed in the light interception state.

Furthermore, as described above, each of the light interception sections 27 formed on the light interception plates 10A and 10B alternately with the light transmission sections 28 has the center region 27a printed in solid black and the semi-interception region 27b, the light transmittance of which gradually increases from the portion thereof adjacent to the center region 27a toward the light transmission section 28. Thus, even though the light interception plate 10A is unaligned with the light interception plate 10B, a gap or a stripe can be prevented from being generated on the rear window 3 in the transmission state.

Figure 16A:
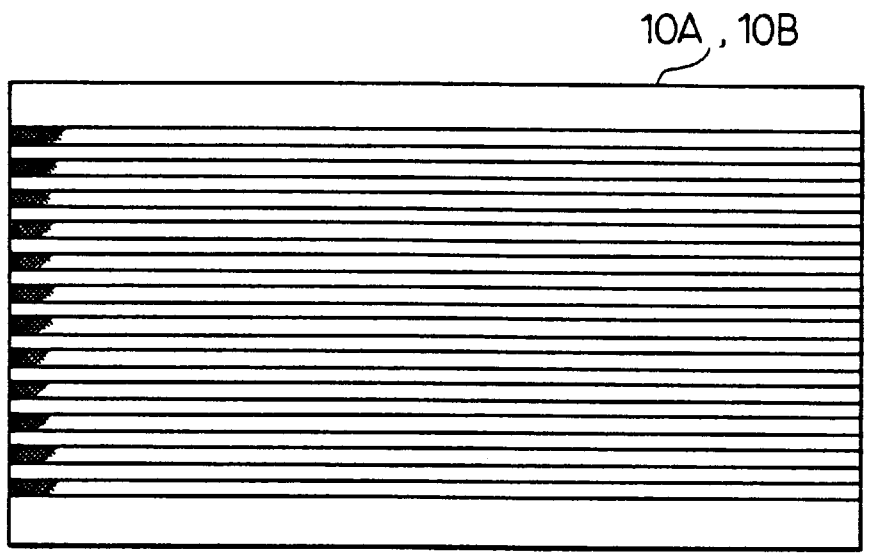
FIGS. 16A and 16B are front views each showing a light interception plate, according to a third embodiment, viewed outside an automobile, respectively.
Figure 16B:
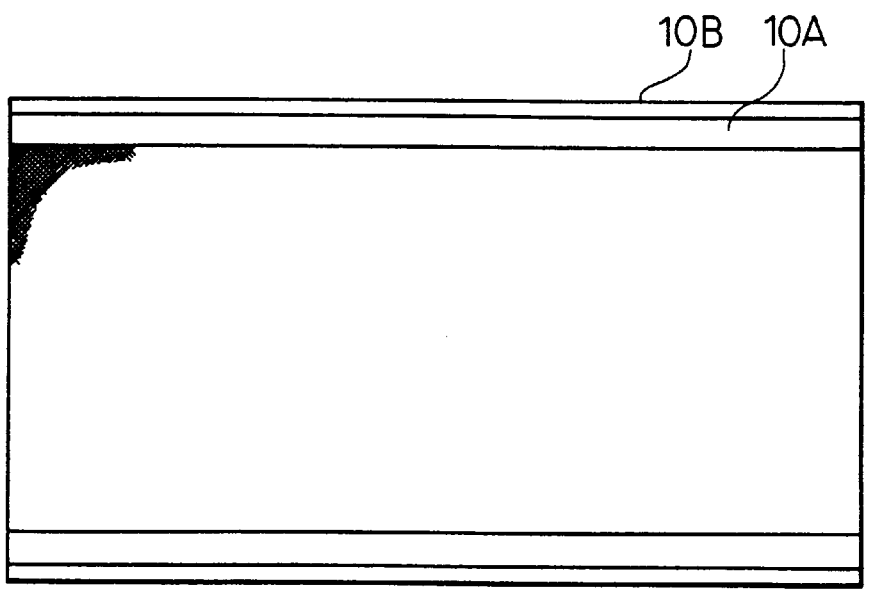

Further, in the light transmittance adjusting apparatus of the second embodiment, grey ink is printed solidly on the light interception section 27 of the light interception plate 10B to form the character "CLOSED" 39. Thus, as shown by an arrow Q' of FIG. 2, the character "CLOSED" 39 cannot be seen when a person looks at the rear window 3 outside the automobile 2 in the light transmission state or the light transmission state, as shown in FIGS. 16A and 16B.

A light transmittance adjusting apparatus according to a fourth embodiment is described below with reference to FIGS. 17A, 17B, 18A, and 18B.

Figure 17A:
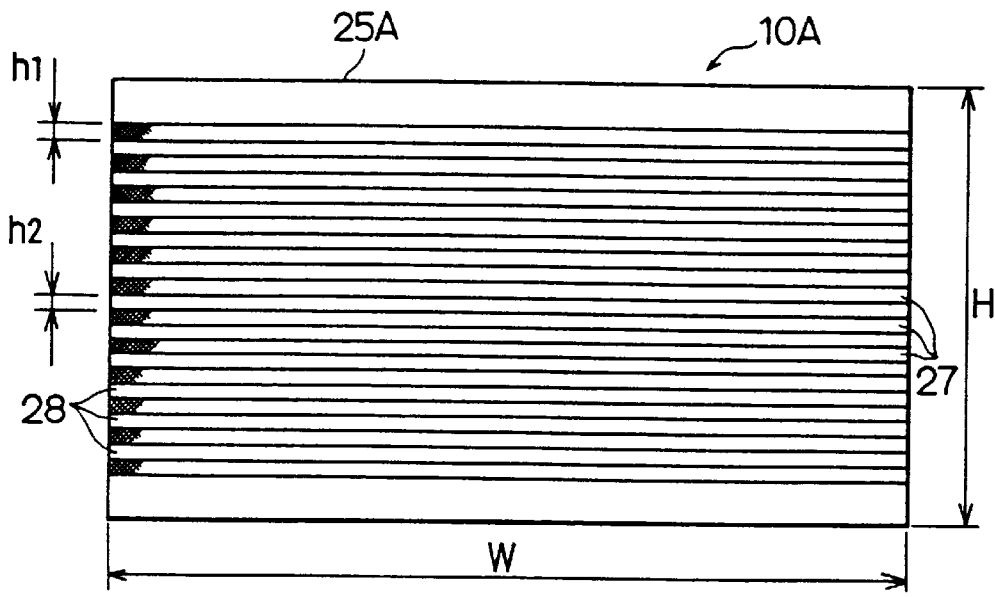
FIGS. 17A and 17B are front views each showing a light interception plate according to a fourth embodiment, respectively.
Figure 17B:
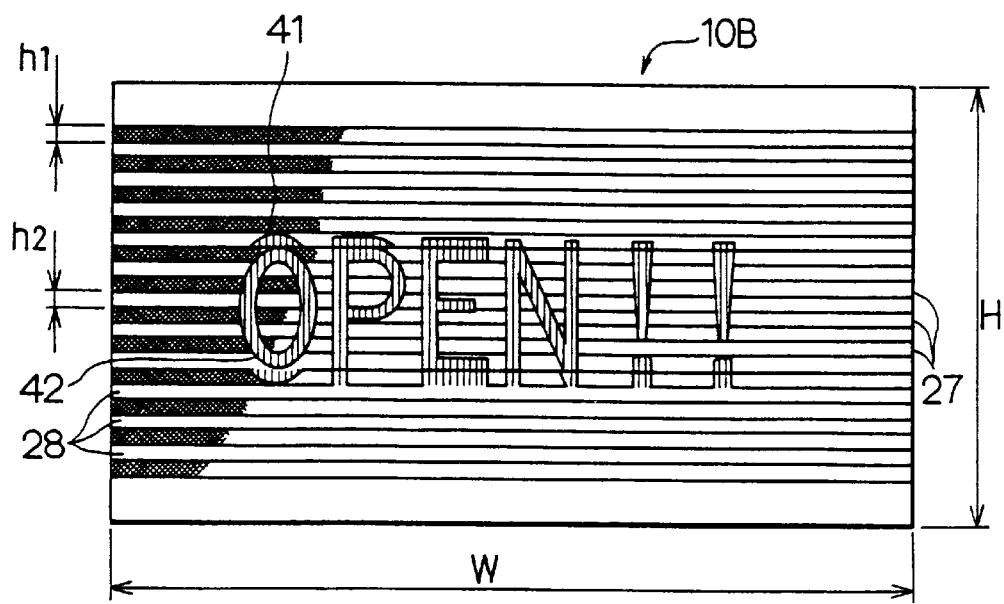
Figure 18A:
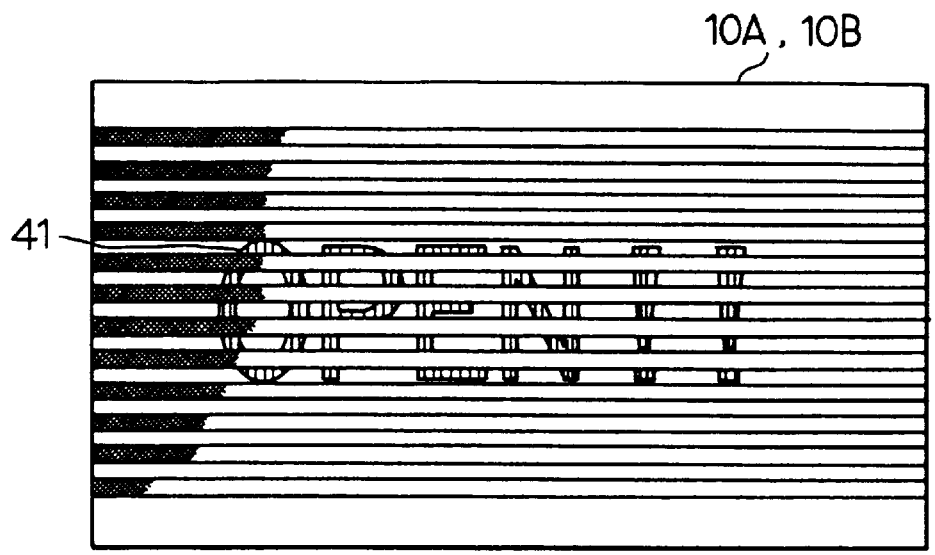
FIGS. 18A and 18B are front views showing a light transmission and light interception states according to the fourth embodiment, respectively.
Figure 18B:
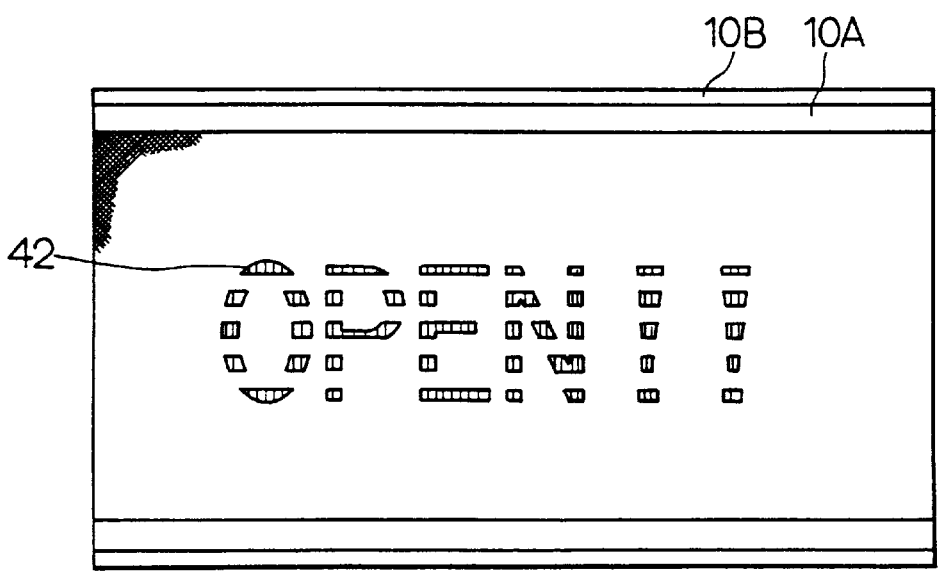
Figure 19A:
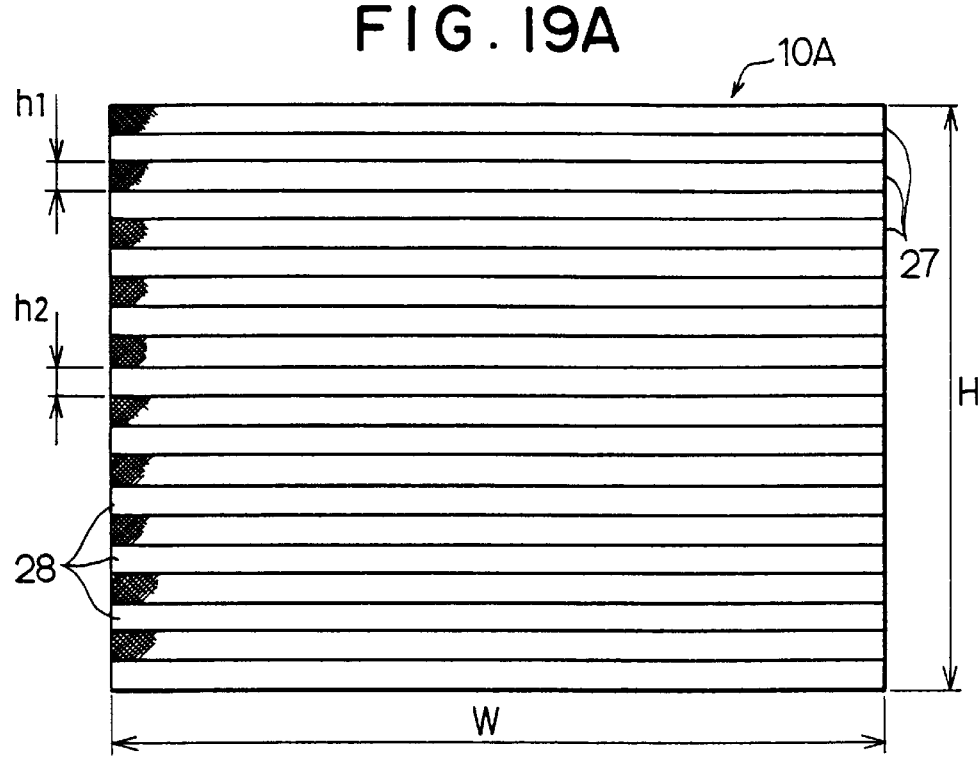
FIGS. 19A and 19B are front views each showing a light interception plate according to a fifth embodiment, respectively.
Figure 19B:
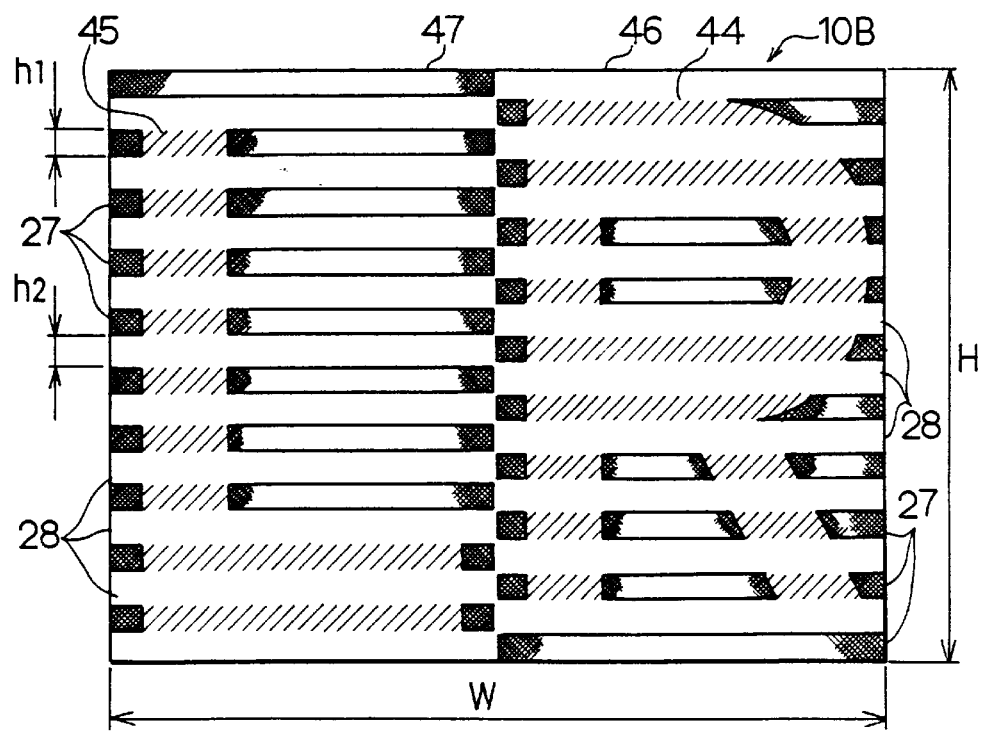

The construction of the light interception plate 10A and that of the light interception plate 10B are as shown in FIGS. 17A and 17B, respectively. In the light transmission time, a red character "OPEN!!" 41 is displayed as shown in FIG. 18A, whereas in the light interception time, a red character "OPEN!!" 42 is displayed as shown in FIG. 18B. The construction of the light transmittance adjusting apparatus of the fourth embodiment is the same as that of the light transmittance adjusting apparatus of the first embodiment except the construction of the light interception plates 10A and 10B.

The light interception plate 10A fixed to the inner side of the movable member 6 has the same construction as that of the light interception plate 10A of the first embodiment. That is, the light interception plate 10A comprises the transparent substrate 25A on which the light interception sections 27 and the light interception sections 28 are formed alternately with each other. The construction of the light interception section 27 of the light interception plate 10A is also identical to that of the light interception section 27 of the light interception plate 10A of the first embodiment. That is, the light interception section 27 has the semi-interception region 27b formed in the region between the center region 27a printed in solid black and the light transmission section 28. The light transmittance of the semi-light interception region semi-interception region 27b gradually increases from the center region 27a toward the light transmission section 28.

Referring to FIG. 17B, the light interception plate 10B fixed to the inner face 5a, of the transparent casing 5, at the outer side (Y) thereof comprises the transparent substrate 25A on which the light interception sections 27 and the light interception sections 28 are formed alternately with each other, similarly to the light interception plate 10B of the first embodiment. The light interception section 27 has the semi-interception region 27b formed in the region between the center region 27a printed in solid black and the light transmission section 28. The light transmittance of the semi-light interception region semi-interception region 27b gradually increases from the center region 27a toward the light transmission section 28.

The red character "OPEN!!" 41 to be displayed in the light transmission time and the red character "OPEN!!" 42 to be displayed in the light interception time are formed by solidly printing red ink on the transparent substrate 25B and the light interception sections 27, respectively.

Red ink is printed solidly on the transparent substrate 25B at portions thereof corresponding to the light transmission sections 28 to form the mark "OPEN" 41, while red ink is not printed on the light interception sections 27. Thus, the character "OPEN" 41 is blank at portions thereof corresponding to the light interception sections 27.

Red ink is printed solidly on the light interception sections 27 to form the mark "OPEN" 42, while the red ink is not printed on the substrate 25B at portions thereof corresponding to the light transmission sections 28. Thus, the character "OPEN" 42 is blank at portions thereof corresponding to the light transmission sections 28.

Referring to FIG. 18A, in the light transmission state, namely, when the light interception section 27 of the light interception plate 10A and the light interception section 27 of the light interception plate 10B align with each other, and the light transmission section 28 of the light interception plate 10A and the light transmission section 28 of the light interception plate 10B align with each other, the character "OPEN" 41 formed by printing the red ink solidly on the light transmission sections 28 of the light interception plate 10B can be seen inside the automobile 2. The character "OPEN" 42 formed by printing the red ink solidly on the light interception sections 27 of the light interception plate 10B, however, cannot be seen inside the automobile 2, because the character "OPEN" 42 is intercepted by the light interception section 27 of the light interception plate 10A.

Accordingly, only the character "OPEN" 41 is seen inside the automobile 2 in the light transmission state.

Referring to FIG. 18B, in the light interception state, namely, when the light interception section 27 of the light interception plate 10A and the light transmission section 28 of the light interception plate 10B align with each other, and the light transmission section 28 of the light interception plate 10A and the light interception section 27 of the light interception plate 10B align with each other, the character "OPEN" 42 formed by printing the red ink solidly on the light interception sections 27 of the light interception plate 10B can be seen inside the automobile 2. The character "OPEN" 42 formed by printing the red ink solidly on the light transmission sections 28 of the light interception plate 10B, however, cannot be seen inside the automobile 2, because the character "OPEN" 42 is intercepted by the light interception sections 27 of the light interception plate 10A. Accordingly, only the character "OPEN" 42 is seen inside the automobile 2 in the light interception state.

As described above, in the light transmittance adjusting apparatus of the fourth embodiment, the light transmittance of the rear window 3 is adjusted in both the light transmission state and the light interception state; and the character "OPEN!!" 41 is displayed in the light transmission state and the character "OPEN!!" 42 is displayed in the light interception state. Furthermore, as described above, each of the light interception sections 27 formed on the light interception plates 10A and 10B alternately with the light transmission sections 28 has the center region 27a printed in solid black and the semi-interception region 27b, the light transmittance of which gradually increases from the portion thereof adjacent to the center region 27a toward the light transmission section 28. Thus, even though the light interception plate 10A is unaligned with the light interception plate 10B, a gap or a stripe can be prevented from being generated on the rear window 3 in the transmission state.

A light transmittance adjusting apparatus according to a fifth embodiment is described below with reference to FIGS. 19A, 19B, 20A, and 20B.

Figure 20A:
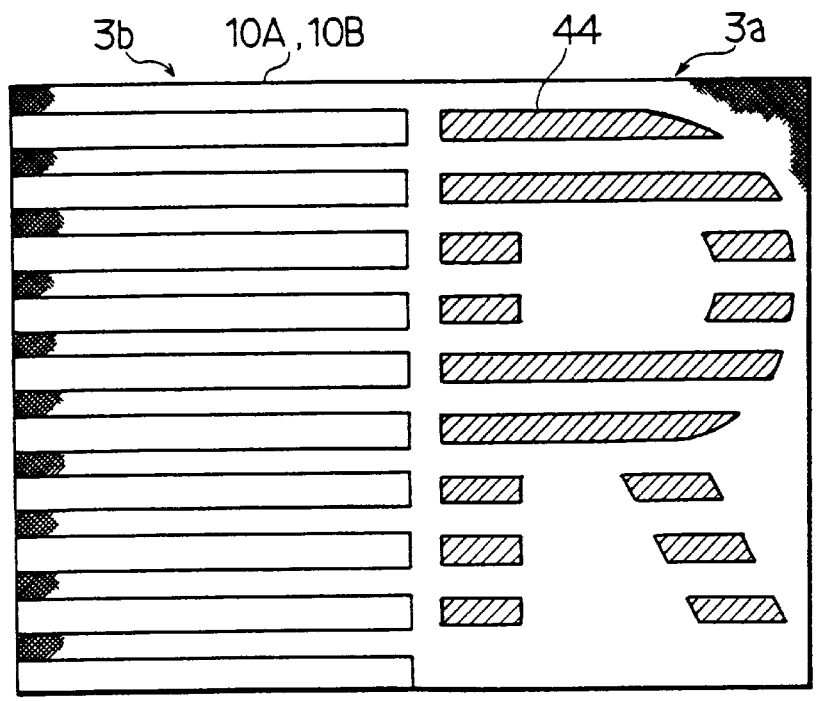
FIGS. 20A and 20B are front views showing states in which a right-hand region of the light interception plate according to the fifth embodiment intercepts and transmits light beams, respectively.
Figure 20B:
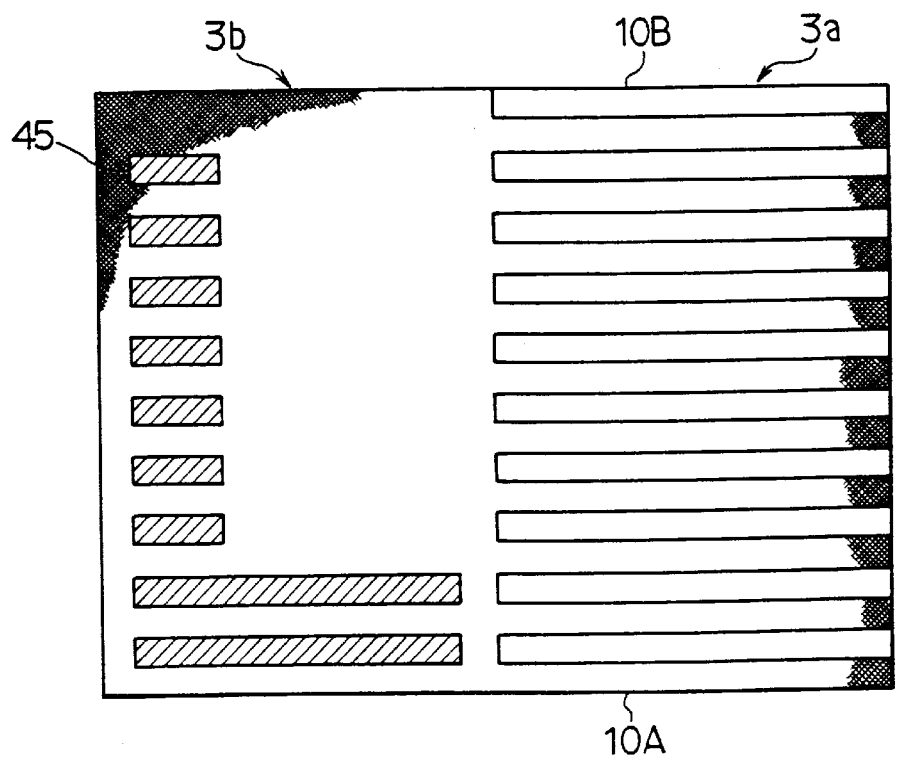

The construction of the light interception plate 10A and that of the light interception plate 10B are as shown in FIGS. 20A and 20B. In the construction, when the right-hand region 3a of the rear window 3 is in the light interception state, the left-hand region 3b thereof is in the light transmission state, as shown in FIG. 20A; and when the left-hand region 3b is in the light interception state, the right-hand hand region 3a is in the light transmission state, as shown in FIG. 20B. Further, a character "R" 44 is displayed in the right-hand region 3a in the light interception state, while a character "L" 45 is displayed in the left-hand region 3b in the light interception state.

The light interception plate 10A fixed to the inner side of the movable member 6 has the same construction as that of the light interception plate 10A of the first embodiment. That is, the light interception plate 10A comprises the transparent substrate 25A on which the light interception sections 27 and the light interception sections 28 are formed alternately with each other. The construction of the light interception section 27 of the light interception plate 10A is also identical to that of the light interception section 27 of the light interception plate 10A of the first embodiment. That is, the light interception section 27 has the center region 27a printed in solid black and the semi-interception region 27b formed in the region between the center region 27a and the light transmission section 28. The light transmittance of the semi-interception region 27b gradually increases from the center region 27a toward the light transmission section 28.

In the light interception plate 10B fixed to the inner face 5a, of the transparent casing 5, at the outer side (Y) thereof, the construction of a right-hand portion 46 corresponding to the right-hand region 3a of the rear window 3 is different from that of a left-hand portion 47 corresponding to the left-hand region 3b thereof. That is, similarly to the first embodiment, although a plurality of light interception sections 27 and a plurality of light transmission sections 28 are formed on both the right-hand portion 46 and the left-hand portion 47, the light interception section 27 of the right-hand portion 46 and the light transmission section 28 of the left-hand portion 47 align with each other widthwise, and the light transmission section 28 of the right-hand portion 46 and the light interception section 27 of the left-hand portion 47 align with each other widthwise.

The grey character "R" 44 is printed solidly on the light interception sections 27 of the right-hand portion 46 of the light interception plate 10B, while grey ink is not printed at portions, of the substrate 25B, corresponding to the light transmission sections 28. Thus, the character "R" 44 is blank at the portions thereof corresponding to the light transmission sections 28 alternating with the light interception sections 27.

The grey character "L" 45 is printed solidly on the light interception sections 27 of the left-hand portion 47 of the light interception plate 10B, while grey ink is not printed at portions, of the substrate 25B, corresponding to the light transmission sections 28. Thus, the character "L" 45 is blank at the portions thereof corresponding to the light transmission sections 28 alternating with the light interception sections 27.

As shown in FIG. 20A, when the light interception plate 10A is positioned so that the light interception section 27 of the right-hand portion 46 of the light interception plate 10B aligns with the light transmission section 28 of the light interception plate 10A and so that the light transmission section 28 of the right-hand portion 46 of the light interception plate 10B aligns with the light interception section 27 of the light interception plate 10A, the light interception section 27 of the left-hand portion 47 of the light interception plate 10B aligns with the light interception section 27 of the light interception plate 10A, and the light transmission section 28 of the left-hand portion 47 of the light interception plate 10B aligns with the light transmission section 28 of the light interception plate 10A. As a result, the right-hand portion 46 of the light interception plate 10B is placed in the light interception state, while the left-hand portion 47 thereof is placed in the light transmission state. At this time, the character "R" 44 formed by printing grey ink solidly on the light interception sections 27 of the right-hand portion 46 of the light interception plate 10B can be seen inside the automobile 2, whereas the character "L" 44 formed by printing the grey ink solidly on the light interception sections 27 of the left-hand portion 47 thereof cannot be seen inside the automobile 2.

As shown in FIG. 20B, when the light interception plate 10A is moved to position the light interception plate 10A so that the light interception section 27 of the left-hand portion 47 of the light interception plate 10B aligns with the light transmission section 28 of the light interception plate 10A and so that the light transmission section 28 of the left-hand portion 47 of the light interception plate 10B aligns with the light interception section 27 of the light interception plate 10A, the light interception section 27 of the right-hand portion 46 of the light interception plate 10B aligns with the light transmission section 27 of the light interception plate 10A, and the light transmission section 28 of the right-hand portion 46 of the light interception plate 10B aligns with the light interception section 28 of the light interception plate 10A. As a result, the left-hand portion 47 of the light interception plate 10B is placed in the light interception state, while the right-hand portion 46 thereof is placed in the light transmission state. At this time, the character "L" 45 formed by printing the grey ink solidly on the light interception sections 27 of the left-hand portion 47 of the light interception plate 10B can be seen inside the automobile 2, whereas the character "R" 44 formed by printing the grey ink solidly on the light interception sections 27 of the right-hand portion 46 thereof cannot be seen inside the automobile 2.

A light transmittance adjusting apparatus according to a sixth embodiment is described below with reference to FIGS. 21 through 24.

Figure 21A:
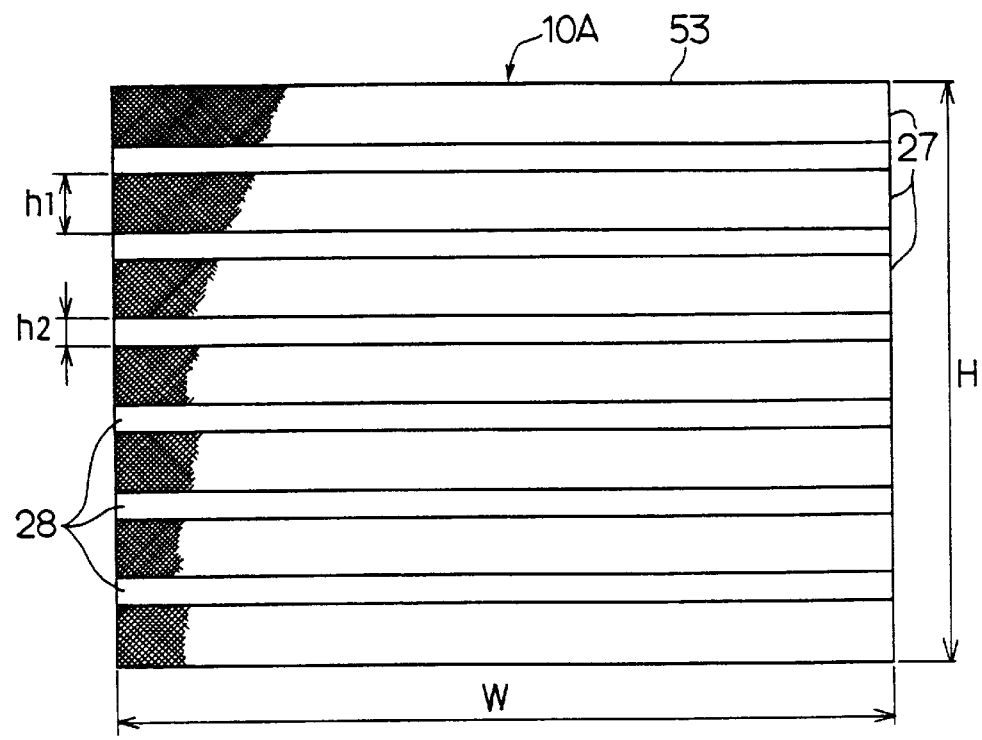
FIGS. 21A and 21B are front views each showing a light interception plate according to a sixth embodiment, respectively.
Figure 21B:
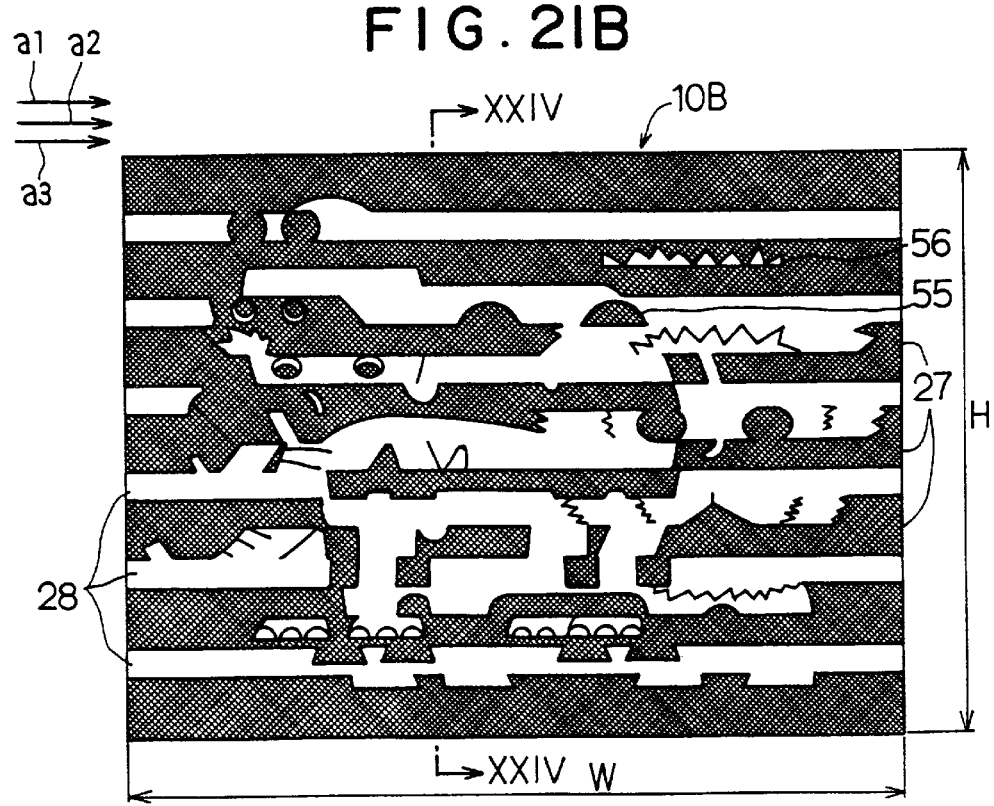
Figure 22A:
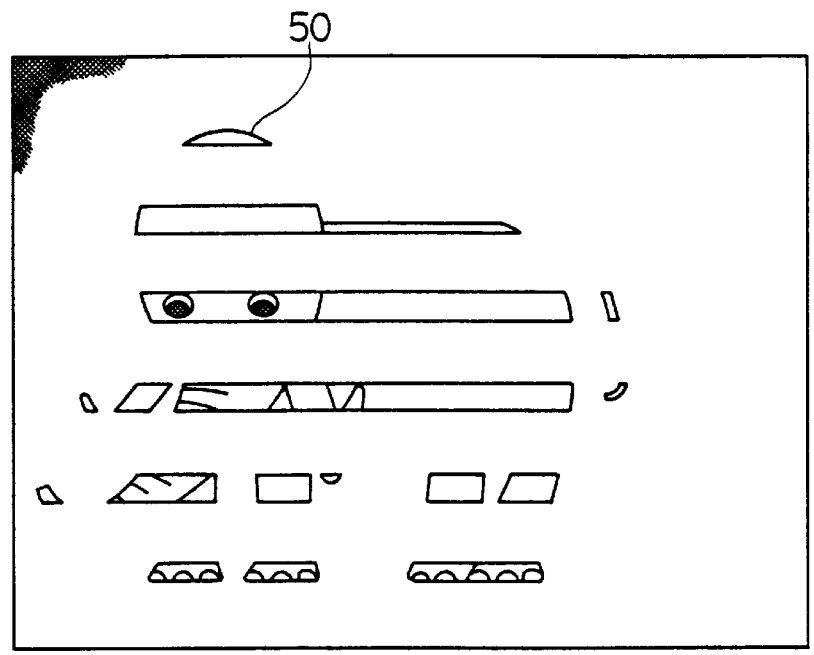
FIGS. 22A and 22B are front views showing a first and second states of the light interception plate according to the sixth embodiment, respectively.
Figure 22B:
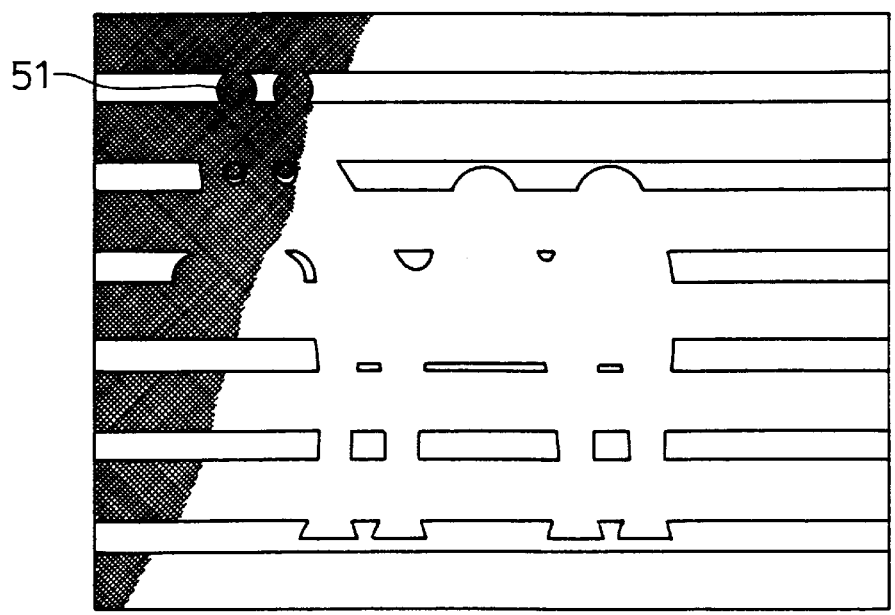
Figure 23:
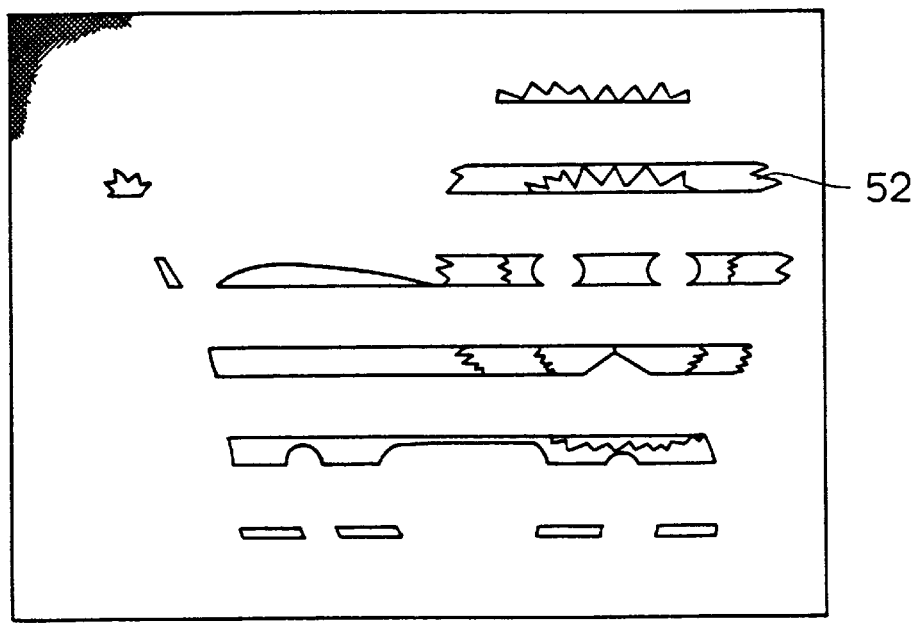
FIG. 23 is a front view showing a third state of the light interception plate according to the sixth embodiment.

The construction of the light interception plate 10A and that of the light interception plate 10B are as shown in FIGS. 21A and 21B, respectively. The light interception plate 10B has a high light transmittance in the middle portion thereof to display a FIG. 50 of an elephant as shown in FIG. 22A; the light interception plate 10B has a high light transmittance in the periphery thereof to display a FIG. 51 of a camel as shown in FIG. 22B; and the light interception plate 10B has a high light transmittance in the middle thereof to display a FIG. 52 of a lion as shown in FIG. 23.

Referring to FIG. 21A, the light interception plate 10A fixed to the movable member 6 has the same construction as that of the light interception plate 10A of the first embodiment. That is, the light interception plate 10A comprises the transparent substrate 25A on which the light interception sections 27 and the light transmission sections 28 are formed alternately with each other. The construction of the light interception section 27 of the light interception plate 10A is also identical to that of the light interception section 27 of the light interception plate 10A of the first embodiment. That is, the light interception section 27 has the center region 27a printed in solid black and the semi-interception region 27b, the density of which gradually decreases from the center region 27a toward the light transmission section 28.

Referring to FIG. 21, the light interception plate 10B fixed to the transparent casing 5 has the transparent substrate 25A on which the light interception sections 27 and the light transmission sections 28 are formed alternately with each other, similarly to the light interception plate 10B of the first embodiment. The light interception section 27 has the center region 27a printed in solid black and the semi-interception region 27b, the density of which gradually decreases from the center region 27a toward the light transmission section 28.

Figure 24:
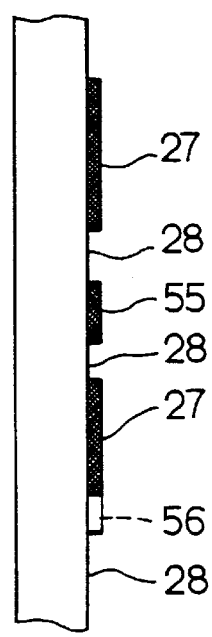
FIG. 24 is a partially enlarged sectional view, showing the light interception plate, taken along a line XXIV—XXIV of FIG. 21B.

The FIGS. 50, 51, and 52 are formed on the light interception plate 10B. In the first through fifth embodiments, characters or diagrams are formed by printing red ink or the like on the light interception sections 27 or the light transmission sections 28, whereas in the sixth embodiment, as shown in FIG. 24, the FIGS. 50, 51, and 52 are formed by forming a portion 55 printed thereon in solid black on the light transmission section 28, as the center region 27a of the light interception section 27 is printed in solid black; and forming a transparent portions 56 partially on the light interception section 27, as the light transmission section 28 is transparent.

The light interception plate 10A fixed to the movable member 6 is moved relative to the light interception plate 10B to place the upper end 53 of the light interception plate 10A at a position shown by an arrow a1 of FIG. 21B. As a result, as shown in FIGS. 22A, the solid black printed on the light interception sections 28 of the light interception plate 10B and the transparent portions 56 formed partially on the light interception sections 27 thereof to form the FIG. 51 of the camel and the FIG. 52 of the lion are hidden behind the light interception sections 27 of the light interception plate 10A, whereas the solid black formed on the light interception sections 28 of the light interception plate 10B and the transparent portions 56 formed partially on the light interception sections 27 thereof to form the FIG. 50 of the elephant are seen through the light interception sections 28 of the light interception plate 10A. In the state shown in FIG. 22A, the light interception plate 10B has a large transparent portion in the middle thereof, thus having a high light transmittance, whereas the light interception plate 10B has a large portion printed in solid black in the periphery thereof, thus having a low light transmittance.

Then, the light interception plate 10A is moved downward relative to the light interception plate 10B to place the upper end 53 of the light interception plate 10A at a position shown by an arrow a2 of FIG. 21B. At this time, the solid black printed on the light interception sections 28 and the transparent portions 56 formed partially on the light interception sections 27 to form the FIG. 50 of the elephant and the FIG. 52 of the lion are hidden behind the light interception sections 27 of the light interception plate 10A, and the solid black formed on the light interception sections 28 of the light interception plate 10B and the transparent portions 56 formed partially on the light interception sections 27 thereof to form the FIG. 51 of the camel are seen through the light interception sections 28 of the light interception plate 10A. In the state shown in FIG. 22B, the light interception plate 10B has a large portion printed in solid black in the middle thereof, thus having a low light transitance, whereas the light interception plate 10B has a large transparent portion in the periphery thereof, thus having a high light transmittance.

Then, the light interception plate 10A is moved downward relative to the light interception plate 10B from the position shown by the arrow a2 to place the upper end 53 of the light interception plate 10A at a position shown by an arrow a3 of FIG. 21B. At this time, the solid black printed on the light interception sections 28 of the light interception plate 10B and the transparent portions 56 formed partially on the light interception sections 27 thereof to form the FIG. 50 of the elephant and the FIG. 51 of the camel are hidden behind the light interception sections 27 of the light interception plate 10A, whereas the solid black formed on the light interception sections 28 of the light interception plate 10B and the transparent portions 56 formed partially on the light interception sections 27 thereof to form the FIG. 52 of the lion are seen through the light interception sections 28 of the light interception plate 10A. In the state shown in FIG. 23, the light interception plate 10B has a large transparent portion in the middle thereof, thus having a high light transmittance, whereas the light interception plate 10B has a large portion printed in solid black in the periphery thereof, thus having a low light transmittance.

As described above, in the light transmittance adjusting apparatus of the sixth embodiment, the light transmittance thereof is adjusted in both the light transmission state and the light interception state; and the FIGS. 50, 51, and 52 are displayed in both the light transmission state and the light interception state. Furthermore, as described above, each of the light interception sections 27 formed on the light interception plates 10A and 10B alternately with the light transmission sections 28 has the center region 27a printed in solid black and the semi-interception region 27b, the light transmittance of which gradually increases from the portion thereof adjacent to the center region 27a toward the light transmission section 28. Thus, even though the light interception plate 10A is unaligned with the light interception plate 10B, a gap or a stripe can be prevented from being generated on the rear window 3 in the transmission state.

The present invention is not limited to the light transmittance adjusting apparatus of the first through sixth embodiment, but many modifications of the present invention can be made.

In the embodiments, as the source for driving the light interception plate 10A, the electrostatic actuator comprising the movable member 6, having two phases, and the fixed member 7, having three phases is used. The movable member 6 comprises transparent electrodes 13a and 13b, and the fixed member 7 comprises the transparent electrodes 16a, 16b, and 16c. The type of the electrostatic actuator of the present invention is not limited to the above one, but an electrostatic actuator may be constructed as follows: An electrode is installed on the fixed member or the movable member; if the electrode is installed on the fixed member, the movable member is used as a dielectric, whereas if the electrode is installed on the movable member, the fixed member is used as a dielectric; and the movable member is driven by an attraction force and a repulsion force generated between an electric charge electrified by static induction and the electrode. Moreover, the light interception plate may be driven by a motor or manually.

In the embodiments, a transparent film made of resin is used as the material of the substrates 25A and 25B of each of the light interception plates 10A and 10B, but a glass plate or a transparent plate made of resin may be used as the material of the substrates 25A and 25B. Further, it is possible to form the light interception section and the light transmission section on the movable member 6 and the fixed member 7, of the electrostatic actuator, having the transparent electrodes 13a and 13b, and 16a, 16b, and 16c mounted on each of the transparent insulation plates 12 and 15 so as to use the movable member 6 and the fixed member 7 as the light interception plates. In addition, instead of providing the light transmittance adjusting apparatus with the stationary light interception plate 10B, the light interception section and the light transmission section may be installed directly on the transparent casing 5 or the rear window 3.

In the embodiments, the width (W) of the light interception plates 10A and 10B is longer than the height (H) thereof; and the light interception sections 27 and the light interception sections 28 alternate with each other vertically. But the height (H) of the light interception plates 10A and 10B may be longer than the width (W) thereof, circular or polygonal. Further, the light interception sections 27 and the light interception sections 28 may alternate with each other horizontally or diagonally. Furthermore, it is possible to form a dot-shaped light interception section having a checkered pattern, a circular pattern or a polygonal pattern formed on a transparent substrate.

Figure 25A:
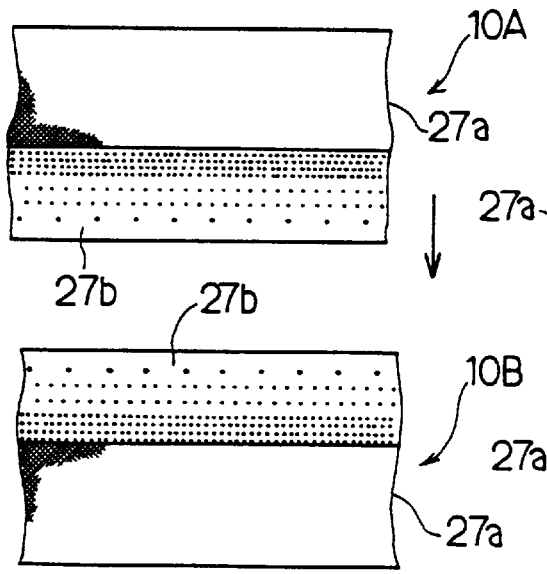
FIGS. 25A and 25B are partially enlarged sectional views showing a relationship between two light interception sections, opposed to each other in a light transmission and light interception states, according to a modified embodiment, respectively.
Figure 25B:
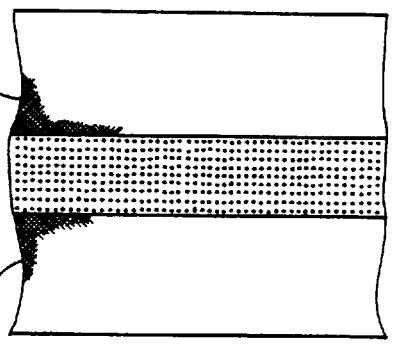
Figure 26A:
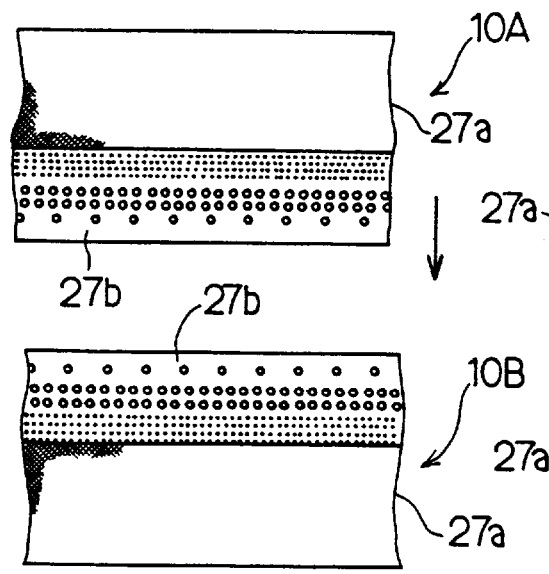
FIGS. 26A and 26B are partially enlarged sectional views showing a relationship between two light interception sections, opposed to each other in a light transmission and light interception states, according to another modified embodiment, respectively.
Figure 26B:
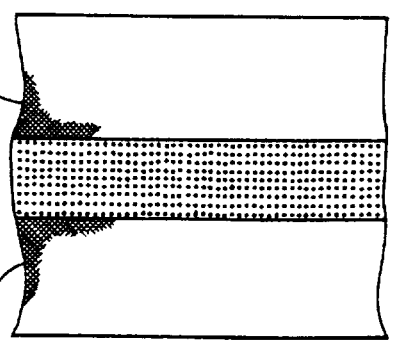

The light interception sections 27 of the embodiments has the semi-interception region 27b formed at both sides of the center region 27a. The light transmittance of the semi-interception region 27b is gradually increased from the portion thereof adjacent to the center region 27a toward the light transmission section 28 by reducing the mesh size thereof gradually. The construction of the semi-interception region 27b is not limited to the above construction. For example, as shown in FIG. 25A, a large number of black dots having a small diameter may be formed on the semi-interception region 27b in such a manner that the black dots become less dense from the portion adjacent to the center region 27a toward the light transmission section 28. The two semi-interception regions 27b opposed to each other in the same vertical position as shown in FIG. 25B intercept light beams in a sufficient degree. Further, a large number of circles having a small diameter is formed on the semi-interception region 27b, as shown in FIG. 26A. The circles become less dense from the portion adjacent to the center region 27a toward the light transmission section 28. Therefore, the two semi-interception regions 27b opposed to each other in the same vertical position as shown in FIG. 26B intercept light beams in a sufficient degree.

A light transmittance adjusting apparatus according to a seventh embodiment is described below with reference to FIGS. 27 and 28. The light transmittance adjusting apparatus is used as a light interception apparatus mounted on the rear window 3 of the automobile 2.

The light transmittance adjusting apparatus comprises a transparent casing 5 fixed, via the installing members 4a and 4b, to the inner face 3a of the rear window 3 installed on the body 11 of the automobile 2. The transparent casing 5 accommodates the electrostatic actuator 8 comprising the movable member 6 and the fixed member 7.

Figure 28:
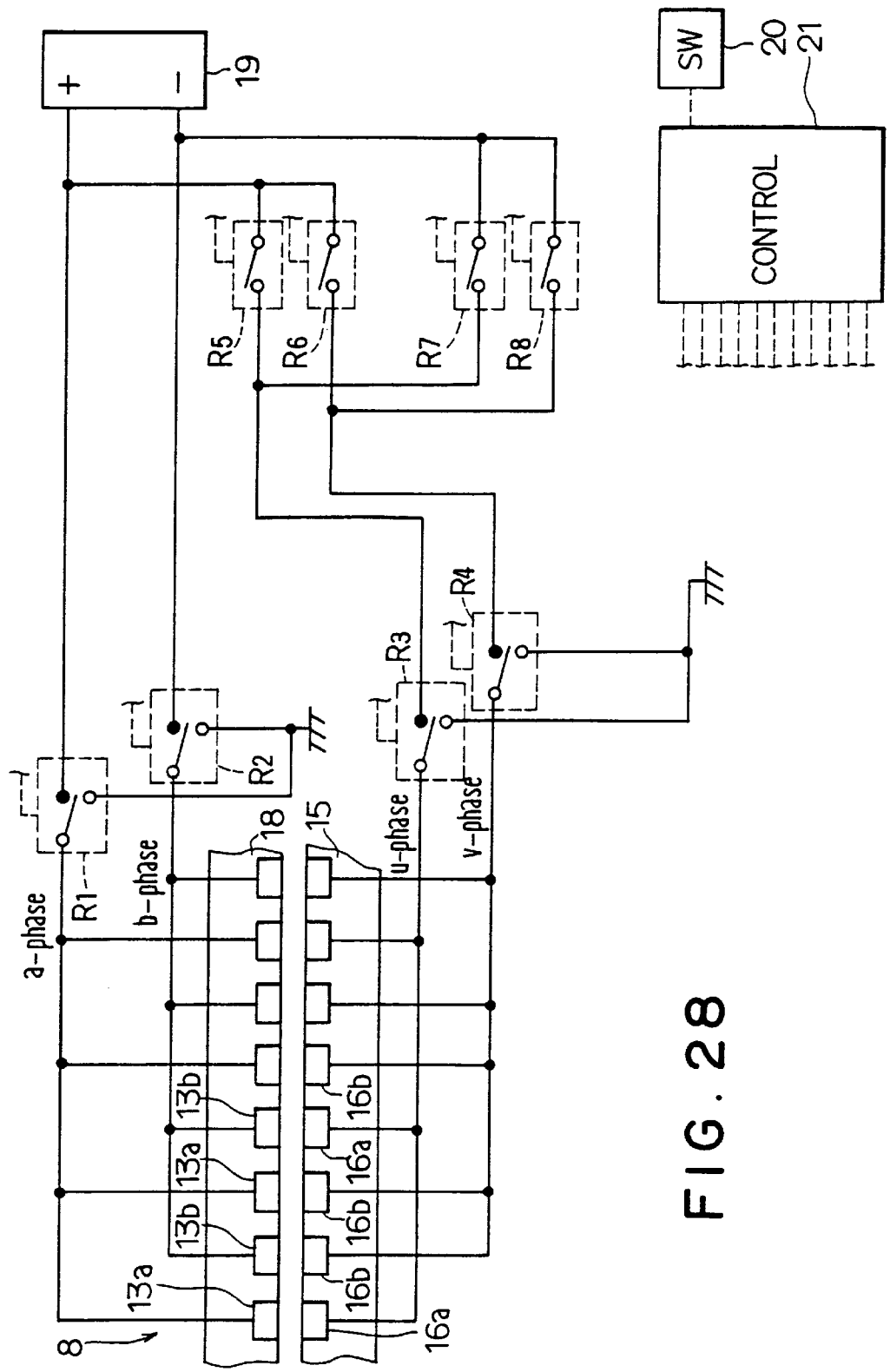
FIG. 28 is a schematic circuit diagram showing the light transmittance adjusting apparatus according to the seventh embodiment of the present invention.
Figure 29:
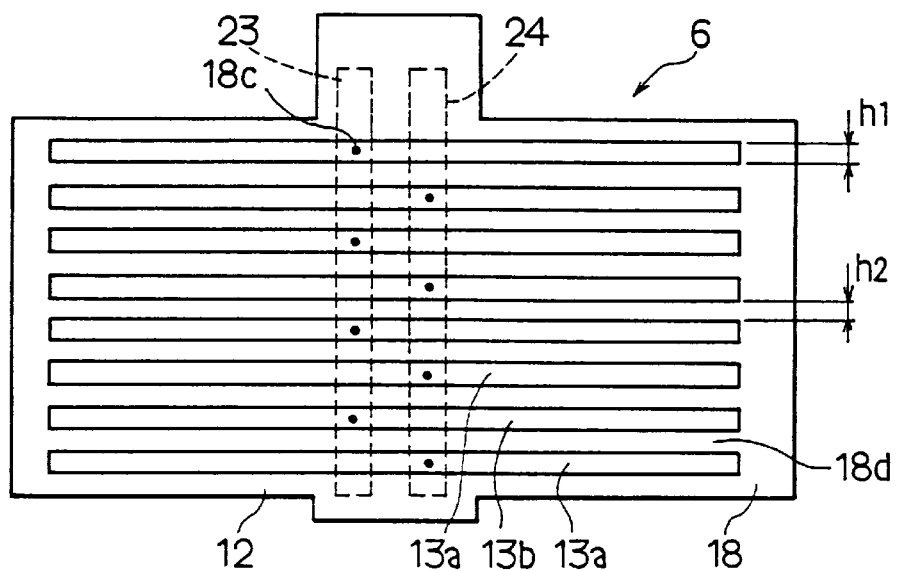
FIG. 29 is a plan view showing the construction of a movable member and that of a fixed member of the light transmittance adjusting apparatus according to the seventh embodiment.

As shown in FIG. 29, the movable member 6 comprises rectangular film electrodes 13a and 13b, having a height h1, alternately formed on one face of a substrate 18 of a transparent film made of polyethylene terephthalate (PET), with an interval h2 provided between the adjacent film electrodes 13a and 13b. The film electrodes 13a and 13b are each made of an nontransparent copper foil. A transparent insulation film 12 shielding the film electrodes 13a and 13b is formed on one face of the substrate 18 so as to insulate the film electrodes 13a and 13b electrically. A pair of parallel transparent electrodes 23 and 24 perpendicular to the film electrodes 13a and 13b is provided on the other face of the substrate 18. The film electrodes 13a and 13b alternating with each other are connected with the transparent electrodes 24 and 23, respectively by means of pin-shaped conductive members (not shown in FIG. 29) penetrating the substrate 18 from one face thereof to the other face thereof so as to connect the film electrodes 13a and the film electrodes 13b with each other, respectively to provide two phases (a-phase, b-phase), as shown in FIG. 28.

The film electrodes 13a and 13b of the movable member 6 having the above-described construction are nontransparent, while each interval portion 18d, of the substrate 18, between the adjacent film electrodes 13a and 13b is transparent. That is, the nontransparent portions and the transparent portions are alternately arranged. The height h1 of the film electrodes 13a and 13b is set to be equal to the interval h2 between the adjacent film electrodes 13a and 13b. Light beams 26 are not incident on both the left-hand and right-hand portions of the substrate 18 because the substrate 18 and the installing member 4a overlap each other at the left-hand and right-hand portions thereof. Therefore, excluding the area of the left-hand and right-hand portions of the substrate 18, the ratio of the area of the transparent portion of the substrate 18, namely, the ratio of the total area of the interval portions 18d to the area of the nontransparent portion thereof, namely, the total area of the film electrodes 13a and 13b is set to 1:1.

The construction of the fixed member 7 is similar to that of the movable member 6. That is, the fixed member 7 comprises rectangular nontransparent film electrodes 16a and 16b, having a length h1, alternately formed on one face of a substrate 17 made of a transparent film, with a predetermined interval h2 provided between the adjacent film electrodes 16a and 16b. The film electrodes 16a and 16b alternating with each other are connected with each of a pair of parallel transparent electrodes (equivalent to the transparent electrodes 23 and 24) provided on the other face of the substrate 17 so as to connect the film electrodes 16a and the film electrodes 16b with each other, respectively to provide two phases (U-phase, V-phase), as shown in FIG. 28. The ratio of the total area of the film electrodes 16a and 16b of the fixed member 7 to that of the interval portions 18d thereof between the respective adjacent film electrodes 16a and 16b is set to 1:1.

The fixed member 7 is fixed to the inner face 5a of the transparent casing 5. The movable member 6 confronting the fixed member 7 is movably accommodated in the transparent casing 5. The face of the substrate 18 on which the film electrodes 13a and 13b of the movable member 6 are mounted confront the face of the substrate 17 on which the film electrodes 16a and 16b of the fixed member 7 are mounted.

As shown in FIG. 28, the film electrodes 13a and 13b of the movable member 6 are connected with a power source 19 through relays R1 and R2. In driving the light transmittance adjusting apparatus, a high positive (hereinafter referred to as "+") voltage is fixedly applied to the transparent electrode 13a having an a-phase, while a negative (hereinafter referred to as "−") high voltage is fixedly applied to the transparent electrode 13b having the b-phase. The transparent electrodes 16a and 16b of the fixed member 7 are connected with the power source 19 through relays R3 through R8. In driving the light transmittance adjusting apparatus, the relays R3 through R8 are switched on and off to apply the high voltage to the transparent electrodes 16a and 16b having a U-phase and a V-phase, respectively by changing the polarity of the high voltage of "+" and "−" to be applied thereto. Reference numeral 20 shown in FIG. 28 denotes an operation switch provided in front of a driver's seat; and 20 denotes a control section 21 which switches the relays R1 through R8 on or off to control the high voltage to be applied to the transparent electrodes 16a and 16b of the fixed member 7, based on the setting of the operation switch 20.

Figure 27:
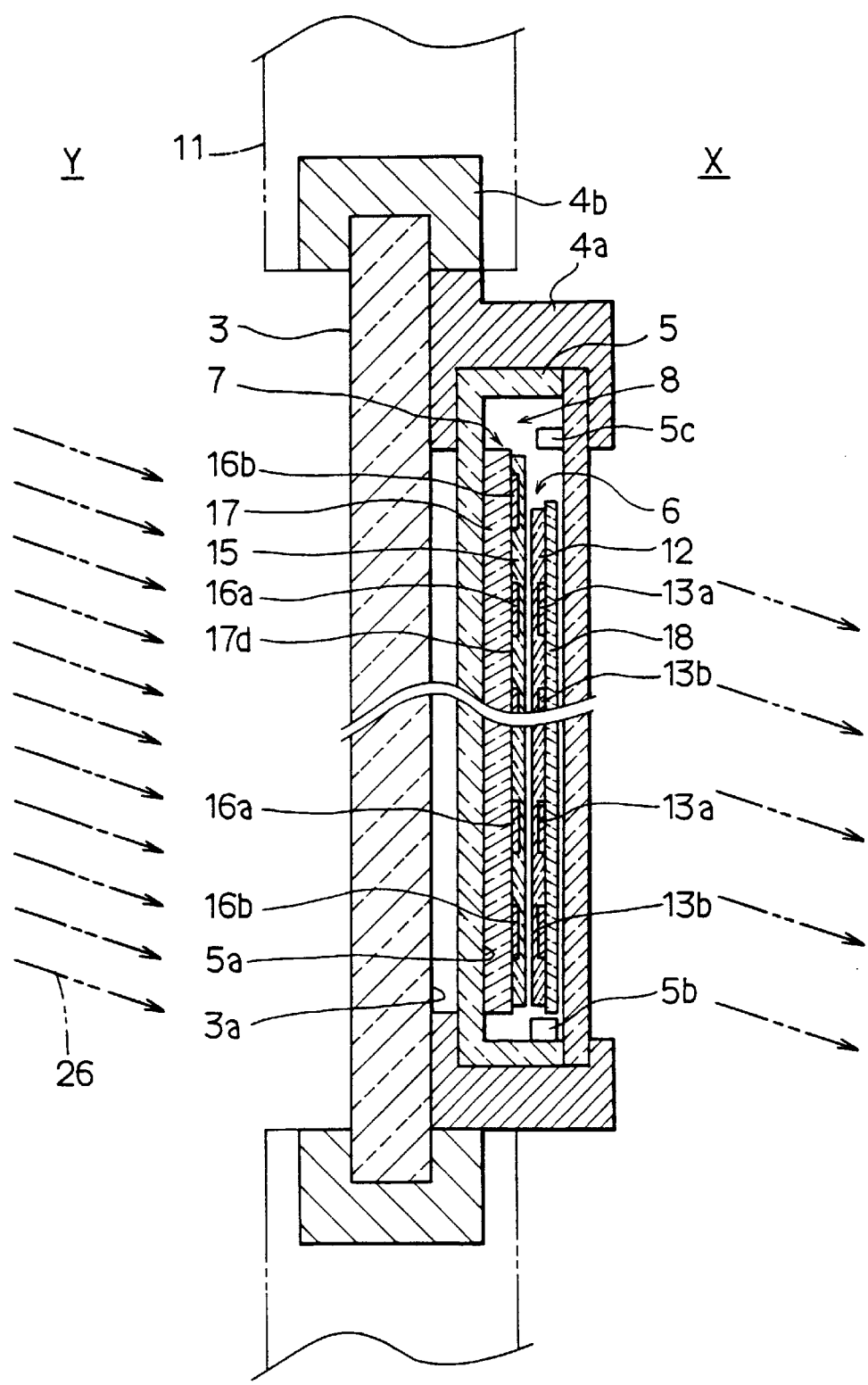
FIG. 27 is a light transmittance adjusting apparatus according to a seventh embodiment of the present invention.

Reference numeral 5b shown in FIG. 27 denotes a lower side-positioning member for positioning the lower limit of the movable member 6. The lower side-positioning member 5b consists of a square pole fixed to the inner face of the transparent casing 5, thus supporting the lower end of the movable member 6 when the movable member 6 is placed at the lower limit. In this embodiment, the lower side-positioning member 5b is provided to allow the vertical position of the film electrodes 13a and 13b of the movable member 6 to be coincident with that of the film electrodes 16a and 16b, of the fixed member 7, confronting the film electrodes 13a and 13b of the movable member 6.

Reference numeral 5a shown in FIG. 27 denotes an upper side-positioning member for positioning the upper limit of the movable member 6. The upper side-positioning member 5c consists of a square pole fixed to the inner face of the transparent casing 5, thus contacting the upper end of the movable member 6 when the movable member 6 is placed at the upper limit. In the seventh embodiment, the upper side-positioning member 5c is provided so that when the movable member 6 is placed at the upper limit, each of the film electrodes 13a and 13b of the movable member 6 confronts a corresponding interval portion 17d positioned between the adjacent film electrodes 16a and 16b of the fixed member 7 and so that each of the film electrodes 16a and 16b of the fixed member 7 confronts the corresponding interval portion 18d positioned between the adjacent film electrodes 13a and 13b of the movable member 6.

The operation of the light transmittance adjusting apparatus of the seventh embodiment is described below.

When the operation switch 20 is turned off to prevent electric voltage from being applied to the electrostatic actuator 8, a high voltage is not supplied to the film electrodes 13a and 13b of the movable member 6 and the film electrodes 16a and 16b of the fixed member 7. Therefore, neither an attraction force nor a repulsion force is generated by static electricity between the film electrodes 13a and 13b of the movable member 6 and the film electrodes 16a and 16b of the fixed member 7 and hence, the movable member 6 is placed at the lower limit due to the dead load. In the seventh embodiment, because the lower side-positioning member 5c is provided, the vertical position of the film electrode 13a and that of the film electrode 13b aligns in coincident with that of the corresponding film electrode 16a and that of the corresponding film electrode 16b, respectively when electric current is not applied to the electrostatic actuator 8. Consequently, the light transmittance adjusting apparatus is placed in an open state when electric current is not applied to the electrostatic actuator 8. As described above, in the seventh embodiment, in the movable member 6 and the fixed member 7, the ratio of the area of the transparent portion to the area of the nontransparent portion is set to 1:1. Thus, about 50% of light beams 26 which have been incident on the rear window 3 from the outside (Y) of the automobile 2 are permitted to enter the interior thereof. That is, the light transmittance of the rear window 3 is approximately 50%.

Then, the operation switch 20 is turned on to apply electric current to the electrostatic actuator 8, the movable member 6 moves upward due to an attraction force and a repulsion force generated by static electricity between the film electrodes 13a and 13b of the movable member 6 and the film electrodes 16a and 16b of the fixed member 7. Thus, with an upward movement of the movable member 6, there is an increase in the area in which the film electrodes 13a and 13b of the movable member 6 and the interval portions 17d of the fixed member 7 overlap each other and in the area in which the film electrodes 16a and 16b of the fixed member 7 and the interval portions 18d of the movable member 6 overlap each other. As a result, the light interception percentage increases.

Figure 31:
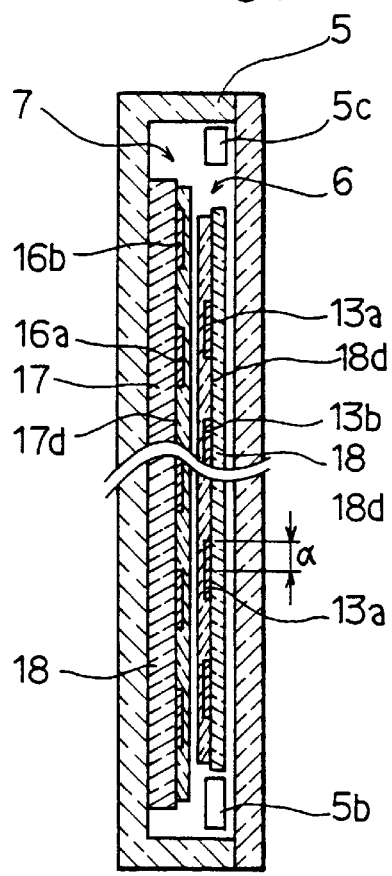
FIG. 31 is a sectional view showing the light transmittance adjusting apparatus according to the eighth embodiment of the present invention.

Referring to FIG. 31, when the movable member 6 contacts the upper side-positioning member 5a and is placed at the upper limit, the film electrodes 13a and 13b of the movable member 6 overlap the interval portions 17d located between the adjacent film electrodes 16a and 16b of the fixed member 7, whereas the film electrodes 16a and 16b of the fixed member 7 overlap the interval portions 18d located between the adjacent film electrodes 13a and 13b of the movable member 6. Consequently, the light transmittance adjusting apparatus is placed in a closed state. That is, when the movable member 6 is placed at the upper limit, almost all of the faces of the light transmittance adjusting apparatus are covered with the nontransparent film electrodes 13a and 13b of the movable member 6 and the nontransparent film electrodes 16a and 16b of the fixed member 7, thus preventing the light beams 26 from being incident into the interior from the outside of the automobile 2.

In the light transmittance adjusting apparatus of the seventh embodiment, the optical interception percentage of the rear window 3 is adjusted by the area in which the nontransparent film electrodes 13a and 13b alternating with each other and formed on the transparent substrate 18 of the movable member 6 of the electrostatic actuator 8 overlap the nontransparent film electrodes 16a and 16b alternating with each other and formed on the transparent substrate 17 of the fixed member 7 of the electrostatic actuator 8. The light transmittance adjusting apparatus of the seventh embodiment has a simple construction, thus eliminating the need for the provision of a polarizing film and can be manufactured at a low cost.

Because in the movable member 6 and the fixed member 7 according to the light transmittance adjusting apparatus of the seventh embodiment, the ratio of the area of the transparent portion to the area of the nontransparent portion is set to 1:1, the optical interception percentage is about 50% (light transmittance is about 50%) in the open state, whereas the optical interception percentage is about 100% (light transmittance is about 0%) in the closed state. That is, there is a great difference in the light transmittance between the open time and the closed time.

Figure 30:
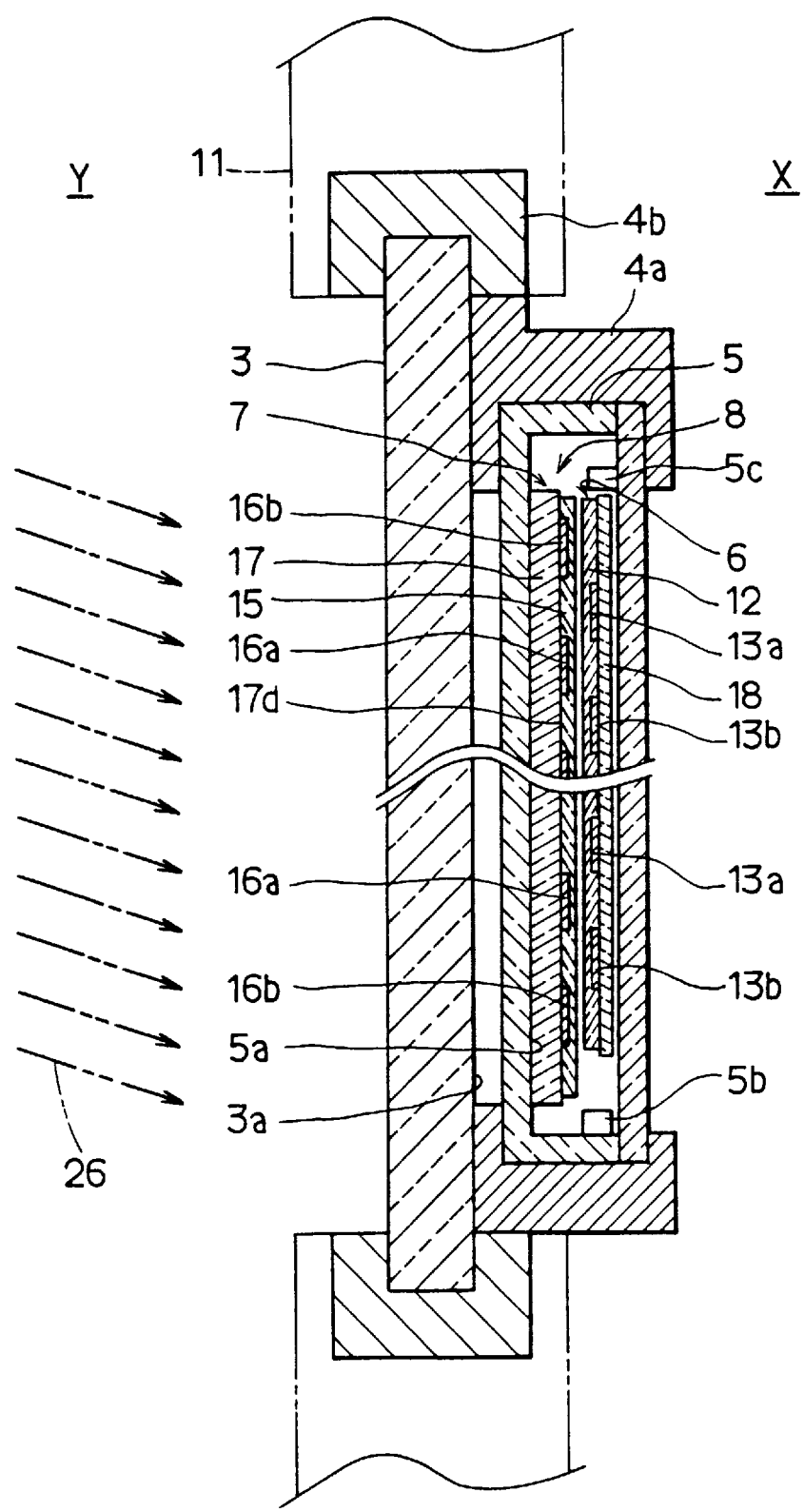
FIG. 30 is a sectional view showing a closed state of a light transmittance adjusting apparatus according to an eighth embodiment.

A light transmittance adjusting apparatus according to an eighth embodiment is described below with reference to FIG. 30. In the eighth embodiment, the lower positioning member 5b is provided so that the film electrodes 13a and 13b of the movable member 6 are positioned above the corresponding film electrodes 16a and 16b of the fixed member 7, respectively by a distance ($\alpha$) when the movable member 6 is positioned at the lower limit because electric current is not applied to the electrostatic actuator 8.

Figure 32A:
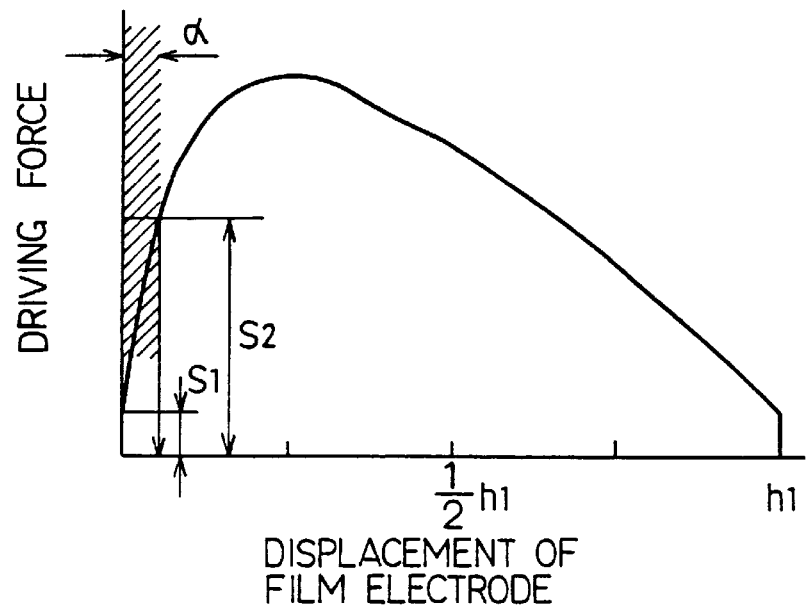
FIGS. 32A and 32B are graphs showing relationships between a displacement of a movable member and a driving force and between the displacement of the movable member and a light transmittance, respectively.

FIG. 32A shows the relationship between the displacement of the film electrodes 13a and 13b of the movable member 6 relative to the film electrodes 16a and 16b of the fixed member 7 and a force for driving the movable member 6 when it is actuated. As shown in FIG. 32A, when the movable member 6 is displaced by the distance ($\alpha$) relative to the fixed member 7, a driving force S2 at the actuation time is much greater than a driving force S1 at a time when the movable member 6 is not displaced relative to the fixed member 7. Thus, the movable member 6 can be reliably moved to intercept light beams.

Figure 32B:
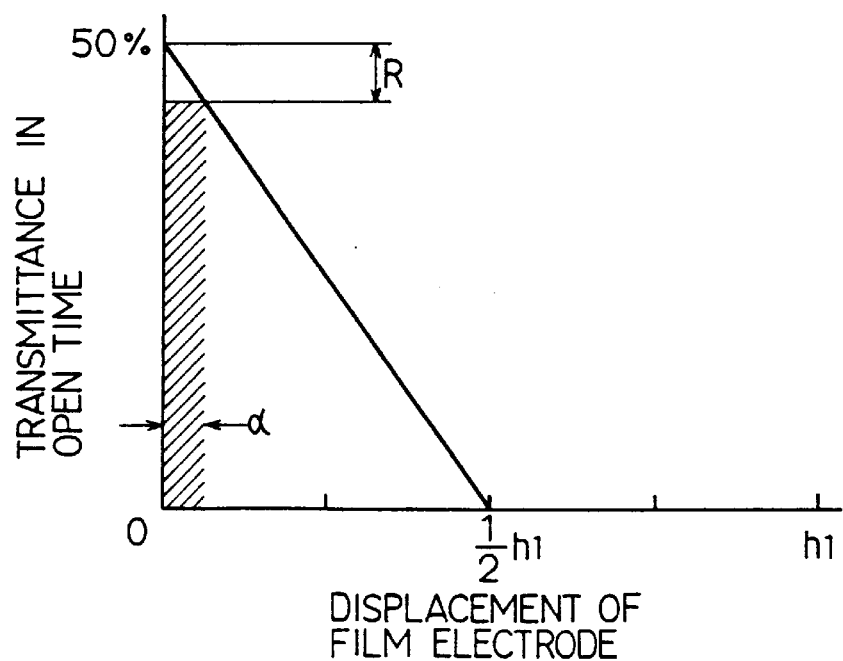

As shown in FIG. 32B, supposing that the movable member 6 is displaced by the distance ($\alpha$) with respect to the fixed member 7, the light transmittance of the rear window 3 decreases by (R) from 50% in the open state. Because the light transmittance decreases linearly with the displacement amount of the movable member 6, the light transmittance decreases slightly if the movable member 6 is displaced slightly. The light transmittance adjusting apparatus of the eighth embodiment has an advantage of actuating the movable member 6 at a great force reliably because the movable member 6 is mounted on the substrate 18 by displacing it relative to the fixed member 7.

The other constructions of the light transmittance adjusting apparatus of the eighth embodiment and the operation thereof are the same as those of the light transmittance adjusting apparatus of the seventh embodiment. That is, the optical interception percentage is adjusted by displacing the movable member 6 having the nontransparent film electrodes 13a and 13b formed on the substrate 18 relative to the fixed member 7 having the nontransparent film electrodes 16a and 16b formed on the substrate 17. Thus, the light transmittance adjusting apparatus of the eighth embodiment has a simple construction.

Light transmittance adjusting apparatuses according to ninth through twelfth embodiments are described below with reference to FIGS. 33A, 33B, 33C, 34A, and 34B. In these embodiments, only the movable member 6 and the fixed member 7 are shown and other constructions are not shown. The constructions of unshown portions are similar to those of the seventh embodiment.

Similarly to the seventh embodiment, in a lower region (L) of the light transmittance adjusting apparatus of the ninth embodiment shown in FIG. 33A, the height of the film electrodes 13a and 13b of the movable member 6 and that of the film electrodes 16a and 16b of the fixed member 7 are equally set to h1, and the interval between the adjacent film electrodes 13a and 13b and that between the adjacent film electrodes 16a and 16b are equally set to h2; and when the movable member 6 is positioned at the lower limit because electric current is not applied to the electrostatic actuator 8, the vertical position of the film electrode 13a of the movable member 6 is coincident with that of the film electrode 16a of the fixed member 7, and the vertical position of the film electrode 13b of the movable member 6 is coincident with that of the film electrode 16b of the fixed member 7. In an upper region (D), however, the height of the film electrodes 13a and 13b of the movable member 6 and that of the film electrodes 16a and 16b of the fixed member 7 are equally set to h1, and the interval between the adjacent film electrodes 13a and 13b and that between the adjacent film electrodes 16a and 16b are equally set to h2, as in the case of the lower region (L). Different from the construction of the lower region (L), in the upper region (D), the film electrodes 13a and 13b of the movable member 6 are mounted on the substrate 18 by shifting them upward by a predetermined distance or height $\alpha'$. Therefore, when the movable member 6 is positioned at the lower limit, the film electrodes 13a and 13b of the movable member 6 are positioned above the film electrodes 16a and 16b of the fixed member 7, respectively.

In the construction of the light transmittance adjusting apparatus of the ninth embodiment, the light transmittance of the lower region (L) is almost 50% in the open time, whereas the light transmittance thereof is almost 0% in the closed time. That is, there is a large difference in the light transmittance of the lower region (L) between the open time and the closed time. In the upper region (D), when electric current is not applied to the electrostatic actuator 8, the film electrodes 13a and 13b of the movable member 6 are positioned above the film electrodes 16a and 16b of the fixed member 7, respectively. Thus, the movable member 6 can be actuated at a sufficient force.

In the upper region (D) of the light transmittance adjusting apparatus of the tenth embodiment shown in FIG. 33B, the height of the film electrodes 13a and 13b of the movable member 6 and that of the film electrodes 16a and 16b of the fixed member 7 are equally set to h1, and the interval between the adjacent film electrodes 13a and 13b and that between the adjacent film electrodes 16a and 16b are equally set to h2, as in the case of the ninth embodiment. The height h1 of the film electrodes 13a and 13b of the movable member 6 and that of the film electrodes 16a and 16b of the fixed member 7 in the lower region (L) are set to be much smaller than that of the film electrodes 13a and 13b of the movable member 6 and that of the film electrodes 16a and 16b of the fixed member 7 in the upper region (D), and the interval h2 between the adjacent film electrodes 13a and 13b of the movable member 6 and that between the adjacent film electrodes 16a and 16b of the fixed member 7 are set to be greater than that between the adjacent film electrodes 13a and 13b of the movable member 6 and that between the film electrodes 16a and 16b of the fixed member 7 in the upper region (D).

Because in the construction of the light transmittance adjusting apparatus according to the tenth embodiment, the heights of the thin electrodes in the lower region (L) and the interval between the adjacent thin electrodes are set as described above, the lower region (L) has a high light transmittance in the open time and allows a sufficient amount of light beams to be incident thereon. The upper region (D) ensures a high light interception percentage, thus intercepting light beams such as sunbeams and providing a driver with a field of view reliably.

Further, because the height of the thin electrodes 13a, 13b, 16a, and 16b in the lower region (L) and the interval between the adjacent thin electrodes therein are set as described above, the movable member 6 can be actuated at a great force.

In the upper region (D) of the light transmittance adjusting apparatus of the eleventh embodiment shown in FIG. 33C, the height of the film electrodes 13a and 13b of the movable member 6 and that of the film electrodes 16a and 16b of the fixed member 7 are equally set to h1, and the interval between the adjacent film electrodes 13a and 13b and that between the adjacent film electrodes 16a and 16b are equally set to h2, as in the case of the ninth embodiment. In the lower region (L), the height of the film electrodes 13a and 13b of the movable member 6 and that of the film electrodes 16a and 16b of the fixed member 7 are equally set to h1, as in the case of the ninth embodiment. The interval h2 between the adjacent film electrodes 13a and 13b in the lower region (L) is set to be much greater by about three times than that between the adjacent film electrodes 16a and 16b in the upper region (D).

The light transmittance adjusting apparatus according to the eleventh embodiment has a high light transmittance in the lower region (L) thereof, whereas it has a low light transmittance in the upper region (D) thereof. Thus, the light transmittance adjusting apparatus reliably intercepts light beams such as sunbeams, thereby providing the driver with a field of view securely.

In the twelfth embodiment shown in FIGS. 34A and 34B, the thin electrodes 13a, 13b, 16a, and 16b positioned in the lower region (L) transmit light to a certain degree. That is, a large number of checkered semitransparent portions 13a', 13b', 16a', and 16b' which transmit light to a certain degree is formed on the thin electrodes 13a, 13b, 16a, and 16b positioned in the lower region (L) of the movable member 6 and the fixed member 7. In the lower region (L), the heights of the film electrodes are equally set and the intervals between the adjacent film electrodes are equally set, as in the case of the ninth embodiment. When the movable member 6 is positioned at the lower limit, the vertical position of the film electrode 13a of the movable member 6 is coincident with that of the film electrode 16a of the fixed member 7 and the vertical position of the film electrode 13b of the movable member 6 is coincident with that of the film electrode 16b of the fixed member 7. In the upper region (D), the height of the film electrodes 13a and 13b of the movable member 6 and that of the film electrodes 16a and 16b of the fixed member 7 are equally set; the interval between the adjacent film electrodes 13a and 13b and that between the adjacent film electrodes 16a and 16b are equally set; and the film electrodes 13a and 13b of the movable member 6 are mounted on the substrate 18 by shifting them upward by α', similarly to the ninth embodiment.

In the construction of the light transmittance adjusting apparatus according to the twelfth embodiment, the film electrodes of the lower region (L) are checkered to transmit light beams. Thus, the lower region (L) has a high light transmittance in both the open time and the closed time, thus intercepting light beams such as sunbeams and providing a driver with a field of view reliably.

Further, in the upper region (D), when electric voltage is not applied to the electrostatic actuator 8, the film electrodes 13a and 13b of the movable member 6 are positioned above the film electrodes 16a and 16b of the fixed member 7 by a certain distance, respectively. Thus, the movable member 6 can be actuated at a sufficient force.

The present invention is not limited to the light transmittance adjusting apparatus of the seventh through twelfth embodiments, but many modifications of the present invention can be made.

For example, the light transmittance adjusting apparatus of the present invention is applied not only to the rear window of the automobile, but also to side windows thereof, sun roofs or windows of a building. In the light transmittance adjusting apparatus described above, a high voltage is applied to the film electrodes of the movable member by fixing the polarity thereof to a positive voltage or a negative voltage, whereas a high voltage is applied to the film electrodes of the fixed member by switching the polarity of the high voltage. It is possible to apply a high voltage to the film electrodes of the fixed member by fixing the polarity thereof to a positive voltage or a negative voltage and apply a high voltage to the film electrodes of the movable member by switching the polarity of the high voltage. Further, in the above-described electrostatic actuator, both the film electrodes of the movable member and the fixed member have two phases, respectively, but the film electrodes of the movable member and those of the fixed member may have two phases and three phases, respectively.

Although the present invention has been fully described in connection with the preferred exemplary embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A light transmittance adjusting apparatus comprising:
    first light interception means including a plurality of first electrodes, the first light interception means further including first transparent sections and first nontransparent sections provided alternately and in parallel with each other;
    second light interception means opposed to the first light interception means and including a plurality of second electrodes, the second light interception means further including second transparent sections and second nontransparent sections provided alternately and in parallel with each other; and
    control means for changing a voltage to be applied to the first electrodes and the second electrodes to move the first light interception means and the second light interception means relative to each other.

2. A light transmittance adjusting apparatus according to claim 1, wherein:
    the first light interception means includes a first light interception plate on which the first transparent sections and the first nontransparent sections are formed; and
    the second light interception means includes a second light interception plate on which the second transparent sections and the second nontransparent sections are formed.

3. A light transmittance adjusting apparatus according to claim 2, wherein:
visible information is formed on one of the first light interception plate and the second light interception plate.

4. A light transmittance adjusting apparatus according to claim 2, wherein:
each of the first nontransparent sections is formed in such a manner that the light transmittance thereof changes gradually in a portion between a center region thereof and ends thereof adjacent to the first transparent section; and
each of the second nontransparent sections is formed in such a manner that the light transmittance thereof changes gradually in a portion between a center region thereof and ends thereof adjacent to the second transparent section.

5. A light transmittance adjusting apparatus according to claim 1, wherein:
the first electrodes are transparent and are applied with a voltage of a fixed polarity; and
the second electrodes are transparent and are applied with a voltage, the polarity of which is reversed.

6. A light transmittance adjusting apparatus according to claim 2, wherein:
the first electrodes are transparent and are applied with a voltage of a fixed polarity; and
the second electrodes are transparent and are applied with a voltage, the polarity of which is reversed.

7. A light transmittance adjusting apparatus according to claim 3, wherein:
the first electrodes are transparent and are applied with a voltage of a fixed polarity; and
the second electrodes are transparent and are applied with a voltage, the polarity of which is reversed.

8. A light transmittance adjusting apparatus according to claim 4, wherein:
the first electrodes are transparent and are applied with a voltage of a fixed polarity; and
the second electrodes are transparent and are applied with a voltage, the polarity of which is reversed.

9. A light transmittance adjusting apparatus according to claim 5, wherein:
a three-phase voltage, a polarity of which is reversed, is applied to the second electrodes.

10. A light transmittance adjusting apparatus according to claim 1, wherein:
the first electrodes and the second electrodes are nontransparent, thus forming the first nontransparent sections and the second nontransparent sections, respectively.

11. A light transmittance adjusting apparatus according to claim 10, wherein:
the first electrodes and the second electrodes are equal to each other in heights thereof and are arranged in such a manner that only a part of the first electrodes and a part of the second electrodes are opposed to face each other.

12. A light transmittance adjusting apparatus according to claim 10, wherein:
the first electrodes and the second electrodes are arranged in such a manner that the first electrodes and the second electrodes are completely opposed to face each other at one location and only partly opposed to face each other at another location.

13. A light transmittance adjusting apparatus according to claim 10, wherein:
the first electrodes and the second electrodes possess different heights and are arranged at intervals different from each other.

14. A light transmittance adjusting apparatus according to claim 10, wherein:
the first electrodes are applied with a voltage of a fixed polarity; and
the second electrodes are applied with a voltage of reversing polarity.

15. A light transmittance adjusting apparatus comprising:
first light interception means that includes a plurality of first electrodes;
second light interception means opposed to the first light interception means, said second light interception means including a plurality of second electrodes;
control means for changing voltage to be applied to at least one of the first electrodes and the second electrodes to effect relative movement between the first light interception means and the second light interception means to adjust light transmittance.

16. A light transmittance adjusting apparatus comprising:
first light interception means that includes a plurality of first electrodes;
second light interception means opposed to the first light interception means, said second light interception means including a plurality of second electrodes; and
control means for applying voltages to the first electrodes and the second electrodes and changing a polarity of the voltage applied to the second electrodes to effect relative movement between the first light interception means and the second light interception means to adjust light transmittance.

17. A light transmittance adjusting apparatus according to claim 15, wherein the light transmittance is adjusted to at least two levels.

18. A light transmittance adjusting apparatus according to claim 16, wherein the light transmittance is adjusted to at least two levels.

19. A light transmittance adjusting apparatus according to claim 15, wherein one of the first light interception means and the second interception means has recognizable information.

20. A light transmittance adjusting apparatus according to claim 16, wherein one of the first light interception means and the second interception means has recognizable information.

21. A light transmittance adjusting apparatus according to claim 19, wherein said one of the first light interception means and the second interception means is disposed on an exterior side of a compartment, and the recognizable information is provided on an interior side surface of said one of the first interception means and the second interception means.

22. A light transmittance adjusting apparatus according to claim 20, wherein said one of the first light interception means and the second interception means is disposed on an exterior side of a compartment, and the recognizable information is provided on an interior side surface of said one of the first interception means and the second interception means.

* * * * *

UNITED STATES PATENT AND TRADEMARK OFFICE
CERTIFICATE OF CORRECTION

PATENT NO. : 5,905,589
DATED : May 18, 1999
INVENTOR(S) : TAKESHI, et al.

It is certified that error appears in the above-identified patent and that said Letters Patent is hereby corrected as shown below:

On the title page, under [30] Foreign Application Priority Data, delete "7-22315" and insert --7-222315--.

Signed and Sealed this

Twenty-third Day of November, 1999

*Attest:*

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO.   : 5,905,589
DATED        : May 18, 1999
INVENTOR(S)  : Takeshi Tanaka et al.

It is certified that error appears in the above-identified patent and that said Letters Patent is hereby corrected as shown below:

On the title page, under [30] Foreign Application Priority Data, delete "7-22315" and insert --7-222315--.

This certificate supersedes Certificate of Correction issued November 23, 1999.

Signed and Sealed this

Twenty-sixth Day of June, 2001

*Attest:*

*Attesting Officer*

NICHOLAS P. GODICI
*Acting Director of the United States Patent and Trademark Office*